US007394561B2

(12) United States Patent
Moro

(10) Patent No.: US 7,394,561 B2
(45) Date of Patent: Jul. 1, 2008

(54) IMAGE FORMING APPARATUS

(75) Inventor: Akihiro Moro, Kawasaki (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1012 days.

(21) Appl. No.: 10/228,923

(22) Filed: Aug. 28, 2002

(65) Prior Publication Data

US 2004/0042019 A1 Mar. 4, 2004

(51) Int. Cl.
*G06K 15/00* (2006.01)
*G03F 3/08* (2006.01)

(52) U.S. Cl. ........................ 358/1.16; 358/521; 358/2.1

(58) Field of Classification Search ................ 358/1.15, 358/1.19, 474, 1.16, 1.2, 404, 444, 468, 500, 358/1.9, 2.1, 3.1, 518, 521, 530; 715/810, 715/811, 813, 825; 709/203, 214–215; 700/91, 700/108; 348/404, 444, 468, 500, 1.9, 2.1, 348/3.1, 518, 521, 1.16, 530

See application file for complete search history.

(56) References Cited

U.S. PATENT DOCUMENTS 6,327,051 B1 12/2001 Moro et al.
6,515,684 B1 * 2/2003 Knodt ........................ 715/777
6,665,098 B1 * 12/2003 Nagarajan ................... 358/474
6,947,961 B2 * 9/2005 Kuroiwa et al. ............. 708/490
6,993,724 B2 * 1/2006 Minagawa .................. 715/810
2001/0017743 A1 * 8/2001 Hamai et al. .................. 360/48
2002/0089683 A1 7/2002 Moro et al.
2003/0081938 A1 * 5/2003 Nishimura et al. ............ 386/52
2003/0099293 A1 * 5/2003 Okada et al. ........... 375/240.13
2003/0161670 A1 * 8/2003 Watanabe et al. ............. 400/61

FOREIGN PATENT DOCUMENTS

JP 9-179698 7/1997
JP 11-309924 * 11/1999

* cited by examiner

*Primary Examiner*—Jerome Grant, II
(74) *Attorney, Agent, or Firm*—Foley & Lardner LLP

(57) ABSTRACT

In the present invention, in a color copy machine, original modes of copy job units, and setting changes of sharpness adjustment, whose updates are permitted beforehand, are totaled, change of default is judged, when this accumulated result is larger than a threshold value, and the original mode whose accumulated result is larger than the threshold value, and the sharpness adjustment are set to change a default state of an image processing unit.

18 Claims, 21 Drawing Sheets

| Copy job number | Original mode | | | Sharpness adjustment | | | | | | | | | One touch | | | |
|---|---|---|---|---|---|---|---|---|---|---|---|---|---|---|---|---|
| | Text mode | Photo mode | Text/photo mode | -4 | -3 | -2 | -1 | 0 | +1 | +2 | +3 | +4 | Warm | Cool | Vivid | Clearness |
| 10 | 7 | 2 | 1 | 0 | 0 | 1 | 0 | 1 | 3 | 5 | 0 | 0 | 1 | 0 | 1 | 0 |

| Hue | | | | | | | Saturation | | | | | | | Color balance | | | | | | | | | | | | | | | | | |
|---|---|---|---|---|---|---|---|---|---|---|---|---|---|---|---|---|---|---|---|---|---|---|---|---|---|---|---|---|---|---|---|
| | | | | | | | | | | | | | | Y | | | | | | | | | M | | | | | | | | |
| -3 | -2 | -1 | 0 | +1 | +2 | +3 | -3 | -2 | -1 | 0 | +1 | +2 | +3 | -4 | -3 | -2 | -1 | 0 | +1 | +2 | +3 | +4 | -4 | -3 | -2 | -1 | 0 | +1 | +2 | +3 | +4 |
| 0 | 0 | 1 | 8 | 0 | 1 | 0 | 0 | 0 | 2 | 7 | 1 | 0 | 0 | 0 | 0 | 1 | 0 | 9 | 0 | 0 | 0 | 0 | 0 | 0 | 0 | 9 | 0 | 1 | 0 | 0 | 0 |

| Color balance | | | | | | | | | | | | | | | | | | RGB adjustment | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|
| C | | | | | | | | | BK | | | | | | | | | R | | | | | | | | | G | | | | | | | | |
| -4 | -3 | -2 | -1 | 0 | +1 | +2 | +3 | +4 | -4 | -3 | -2 | -1 | 0 | +1 | +2 | +3 | +4 | -4 | -3 | -2 | -1 | 0 | +1 | +2 | +3 | +4 | -4 | -3 | -2 | -1 | 0 | +1 | +2 | +3 | +4 |
| 0 | 0 | 0 | 0 | 9 | 1 | 0 | 0 | 0 | 0 | 0 | 0 | 0 | 10 | 0 | 0 | 0 | 0 | 0 | 0 | 0 | 1 | 8 | 0 | 1 | 0 | 0 | 0 | 0 | 0 | 1 | 8 | 0 | 1 | 0 | 0 |

| RGB adjustment | | | | | | | | | Background adjustment | | | | | | | | |
|---|---|---|---|---|---|---|---|---|---|---|---|---|---|---|---|---|---|
| B | | | | | | | | | | | | | | | | | |
| -4 | -3 | -2 | -1 | 0 | +1 | +2 | +3 | +4 | -4 | -3 | -2 | -1 | 0 | +1 | +2 | +3 | +4 |
| 0 | 0 | 1 | 0 | 9 | 0 | 0 | 0 | 0 | 0 | 0 | 0 | 0 | 10 | 0 | 0 | 0 | 0 |

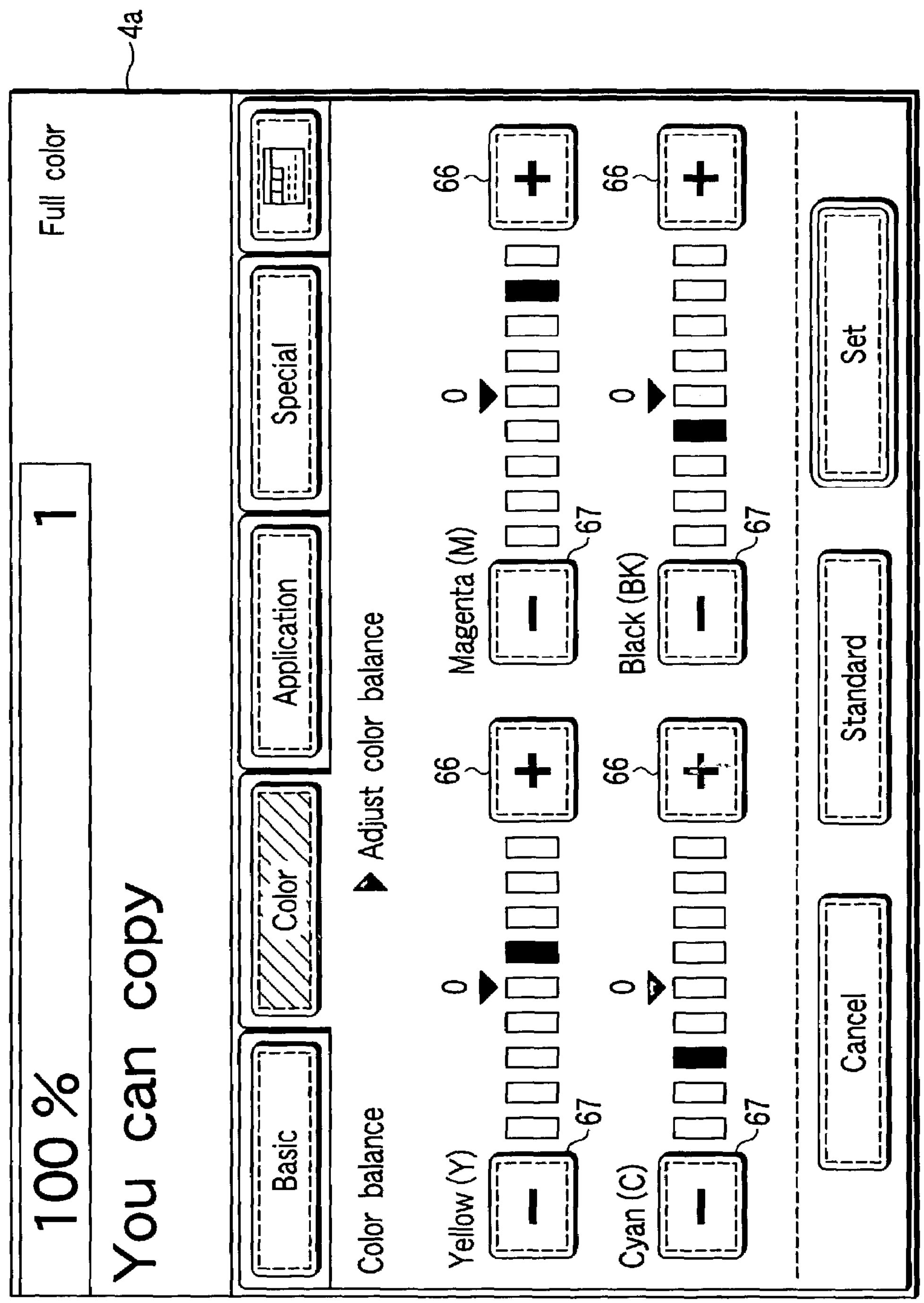
F I G. 10

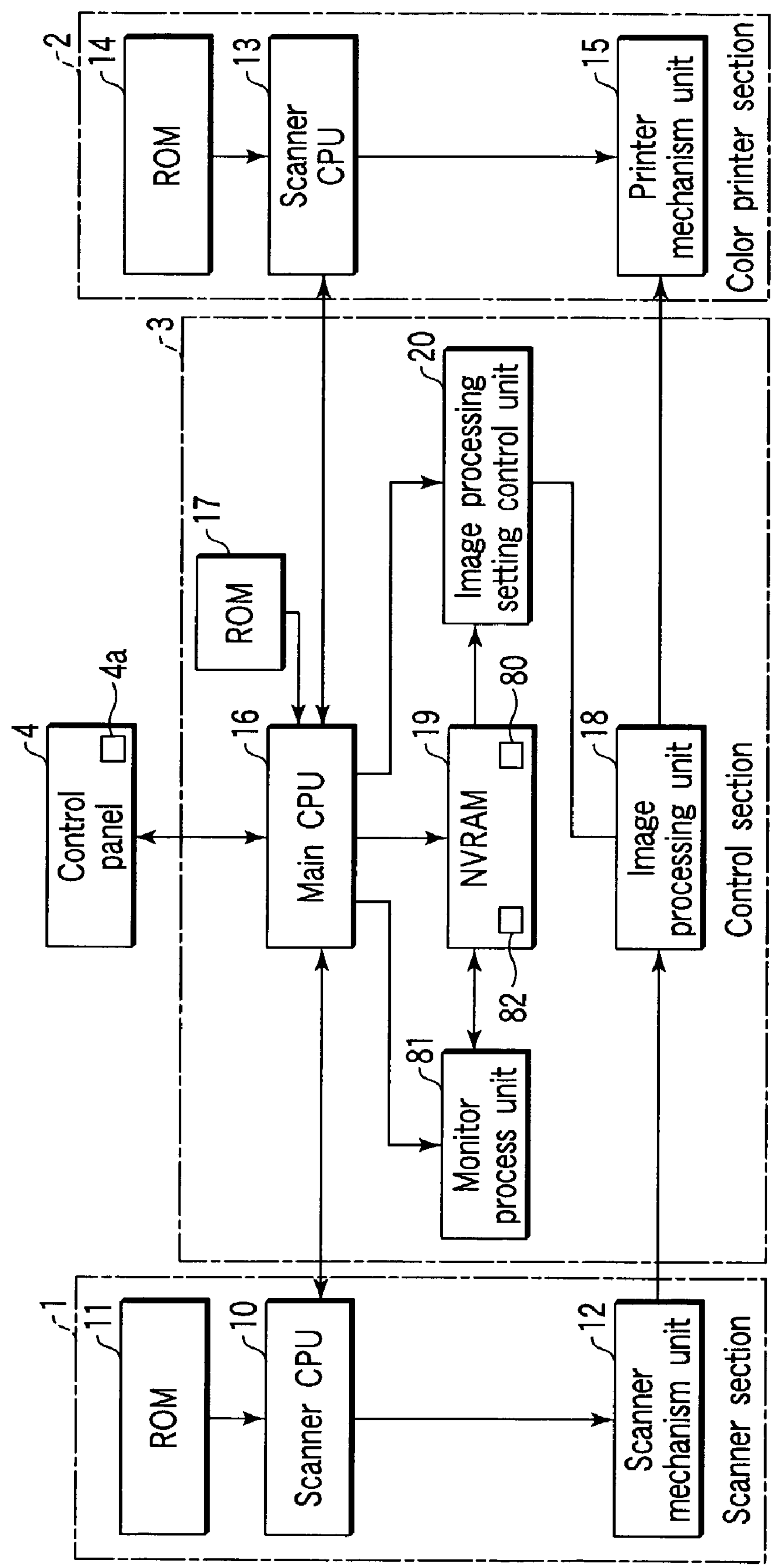
F I G. 17

80

| Management number | Copy job number | Original mode | | | Sharpness adjustment | | | | | | | | | One touch | | | |
|---|---|---|---|---|---|---|---|---|---|---|---|---|---|---|---|---|---|
| | | Text mode | Photo mode | Text/photo mode | -4 | -3 | -2 | -1 | 0 | +1 | +2 | +3 | +4 | Warm | Cool | Vivid | Clearness |
| 0001 | 10 | 7 | 2 | 1 | 0 | 0 | 1 | 0 | 1 | 3 | 5 | 0 | 0 | 1 | 0 | 1 | 0 |
| 0002 | 5 | 0 | 4 | 1 | 0 | 0 | 0 | 0 | 0 | 1 | 1 | 0 | 2 | 0 | 0 | 0 | 0 |

| Hue | | | | | | | Saturation | | | | | | | Color balance | | | | | | | | | | | | | | | | | |
|---|---|---|---|---|---|---|---|---|---|---|---|---|---|---|---|---|---|---|---|---|---|---|---|---|---|---|---|---|---|---|---|
| | | | | | | | | | | | | | | Y | | | | | | | | | M | | | | | | | | |
| -3 | -2 | -1 | 0 | +1 | +2 | +3 | -3 | -2 | -1 | 0 | +1 | +2 | +3 | -4 | -3 | -2 | -1 | 0 | +1 | +2 | +3 | +4 | -4 | -3 | -2 | -1 | 0 | +1 | +2 | +3 | +4 |
| 0 | 0 | 1 | 8 | 0 | 1 | 0 | 0 | 0 | 2 | 7 | 1 | 0 | 0 | 0 | 0 | 1 | 0 | 9 | 0 | 0 | 0 | 0 | 0 | 0 | 0 | 9 | 0 | 1 | 0 | 0 | 0 |
| 0 | 0 | 1 | 4 | 0 | 0 | 0 | 0 | 0 | 0 | 5 | 0 | 0 | 0 | 0 | 0 | 0 | 0 | 5 | 0 | 0 | 0 | 0 | 0 | 0 | 0 | 5 | 0 | 0 | 0 | 0 | 0 |

| Color balance | | | | | | | | | | | | | | | | | | RGB adjustment | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|
| C | | | | | | | | | BK | | | | | | | | | R | | | | | | | | | G | | | | | | | | |
| -4 | -3 | -2 | -1 | 0 | +1 | +2 | +3 | +4 | -4 | -3 | -2 | -1 | 0 | +1 | +2 | +3 | +4 | -4 | -3 | -2 | -1 | 0 | +1 | +2 | +3 | +4 | -4 | -3 | -2 | -1 | 0 | +1 | +2 | +3 | +4 |
| 0 | 0 | 0 | 0 | 9 | 1 | 0 | 0 | 0 | 0 | 0 | 0 | 0 | 10 | 0 | 0 | 0 | 0 | 0 | 0 | 0 | 1 | 8 | 0 | 1 | 0 | 0 | 0 | 0 | 0 | 1 | 8 | 0 | 1 | 0 | 0 |
| 0 | 0 | 0 | 0 | 5 | 0 | 0 | 0 | 0 | 0 | 0 | 0 | 0 | 5 | 0 | 0 | 0 | 0 | 0 | 0 | 0 | 0 | 5 | 0 | 0 | 0 | 0 | 0 | 0 | 0 | 0 | 5 | 0 | 0 | 0 | 0 |

| RGB adjustment | | | | | | | | | Background adjustment | | | | | | | | |
|---|---|---|---|---|---|---|---|---|---|---|---|---|---|---|---|---|---|
| B | | | | | | | | | | | | | | | | | |
| -4 | -3 | -2 | -1 | 0 | +1 | +2 | +3 | +4 | -4 | -3 | -2 | -1 | 0 | +1 | +2 | +3 | +4 |
| 0 | 0 | 1 | 0 | 9 | 0 | 0 | 0 | 0 | 0 | 0 | 0 | 0 | 10 | 0 | 0 | 0 | 0 |
| 0 | 0 | 0 | 0 | 5 | 0 | 0 | 0 | 0 | 0 | 0 | 0 | 0 | 5 | 0 | 0 | 0 | 0 |

FIG. 18

IMAGE FORMING APPARATUS

BACKGROUND OF THE INVENTION

The present invention relates to image forming apparatuses such as a color digital copy machine.

In recent years, digital copy machines have rapidly spread in offices.

For the digital copy machine as a product which replaces a conventional monosaturated analog copy machine, a high-speed monosaturated digital copy machine on which an electronic sort function has been used. In these several years, partly because of a progress in color printed matters, or color data prepared in the office, a color digital copy machine has also increasingly been used.

Particularly, since main body price and copy unit price of the color digital copy machine are still high, many users use the copy machine in a plurality of fields, or use a function by which the use can be limited by a management code for each group. Moreover, concerning adjustment of a copy image quality, in a general product, an image quality adjustment function is imparted onto a control panel so that the adjustment is possible in accordance with a user's purpose.

Moreover, a product having a one-touch adjustment function which is combined with image quality adjustment depending on some product, or a function (set mode memory function) by which a user's set mode can be stored/read is also brought onto market.

As described above, with the color digital copy machine, for the user using the machine in the plurality of divisions, or using the function by which the use can be limited by the management code for each group, the image quality adjustment function on the control panel is generally used to set quality conditions of the image to be copied for each copy and copy the image.

For example, a user who frequently copies a original considering photo reproducibility as important changes a mode to a print photo mode and executes the copy. A user who frequently copies a original including a photo considering thick and clear text reproduction as important adjusts sharpness on a plus side and manually adjusts density on a plus side before copying the original.

Moreover, when the product having the set mode memory function is used, it is necessary to store a set mode state at a copy time by a designated number and call out and use the designated number indicating stored set mode state at the next use time.

Furthermore, as a content proposed in Jpn. Pat. Appln. KOKAI Publication No. 9-179698 (Cannon Inc.), when the user selects/changes a set value of an item with respect to default set values of a plurality of set items (setting with which general users are satisfied), the user can update the default set value. However, in this proposed function, the update is freely possible when desired by a plurality of users as described above. Therefore, confusion is sometimes created, when the copy is desired by the same user on pre-copy conditions.

Therefore, even the user who frequently uses the above-described apparatus has to always change the same setting or read the designated number, and this deteriorates operability.

BRIEF SUMMARY OF THE INVENTION

An object of the present invention is to provide a color image forming apparatus in which for image quality adjustment setting before image formation start, a default state (which changes with an elapse of time) can be set with respect to a user (one user or a plurality of users) having high frequency of use of the apparatus and operationality can be enhanced with respect to the user.

To achieve the object, according to the present invention, there is provided an image forming apparatus comprising:

a read unit which reads a color image from a original;

an image processing unit which converts the color image read by the read unit to an image signal for image formation;

an image forming unit which forms the image on an image forming medium in response to the image signal from the image processing unit;

a storage unit which stores a default value of change of an image quality in the image processing unit;

an instruction unit which instructs the image processing unit to change the image quality by a series of image formation processing units;

a setting process unit which sets the change of the image quality in the image processing unit in accordance with the instruction of the instruction unit and the default value of the change of the image quality of the storage unit;

a judgment unit which judges whether or not the default value of the storage unit is changed based on a change state of the image quality every predetermined number of instructions by the instruction unit; and a change unit to change the default value of the storage unit based on the change state of the image quality, when the judgment unit judges the change of the default value of the storage unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 to FIG. 14 are diagrams showing display examples of a liquid crystal display unit;

FIGS. 16, 17 are block diagrams showing a schematic constitution of an image forming system;

FIG. 18 is a diagram showing the storage example of the monitor table;

DETAILED DESCRIPTION OF THE INVENTION

First Embodiment

An image forming apparatus of a digital color copy machine according to an embodiment of the present invention will be described with reference to the drawings.

Figure 1:
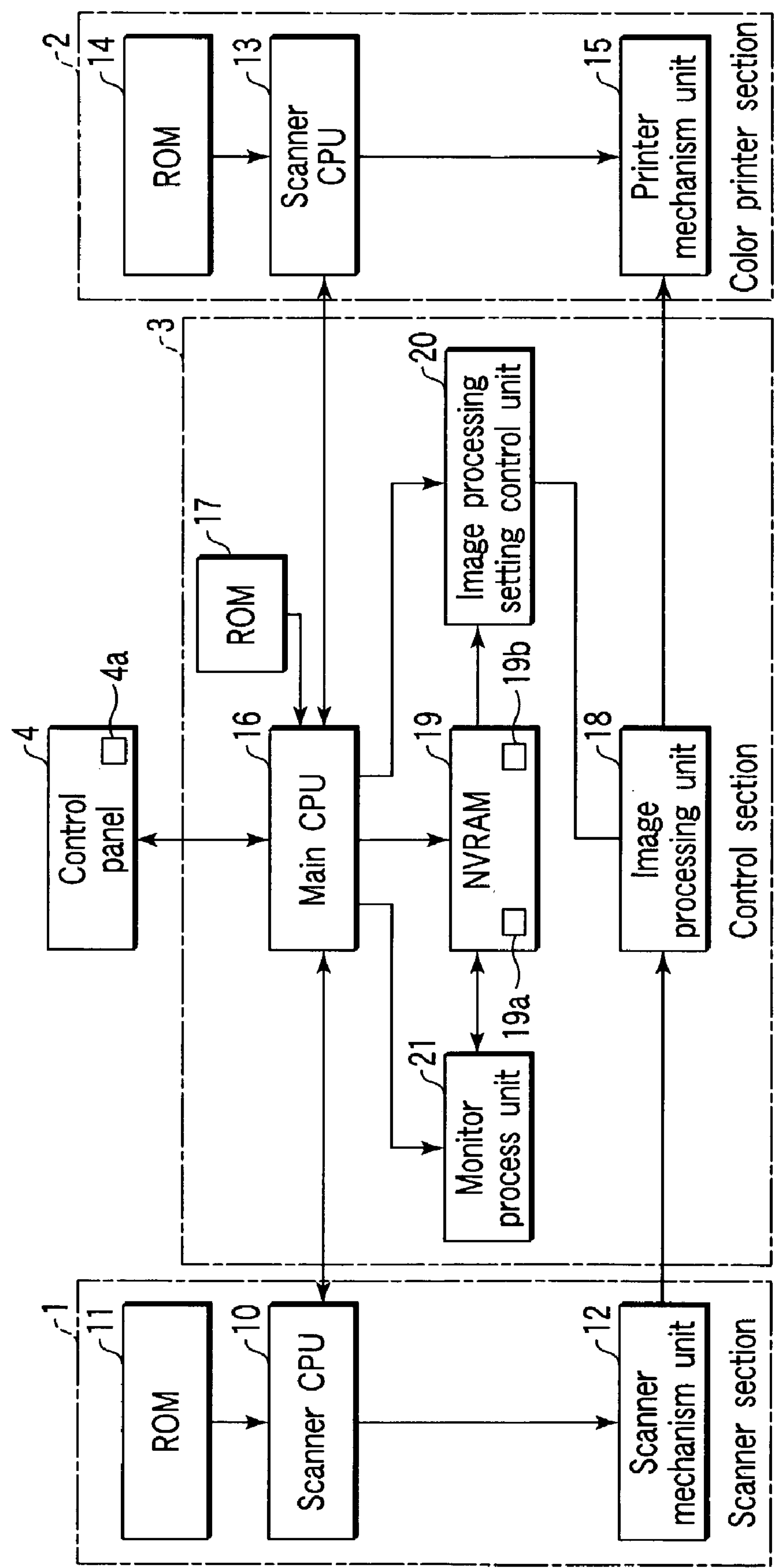
FIG. 1 is a block diagram showing a schematic constitution of an image forming apparatus.
Figure 2:
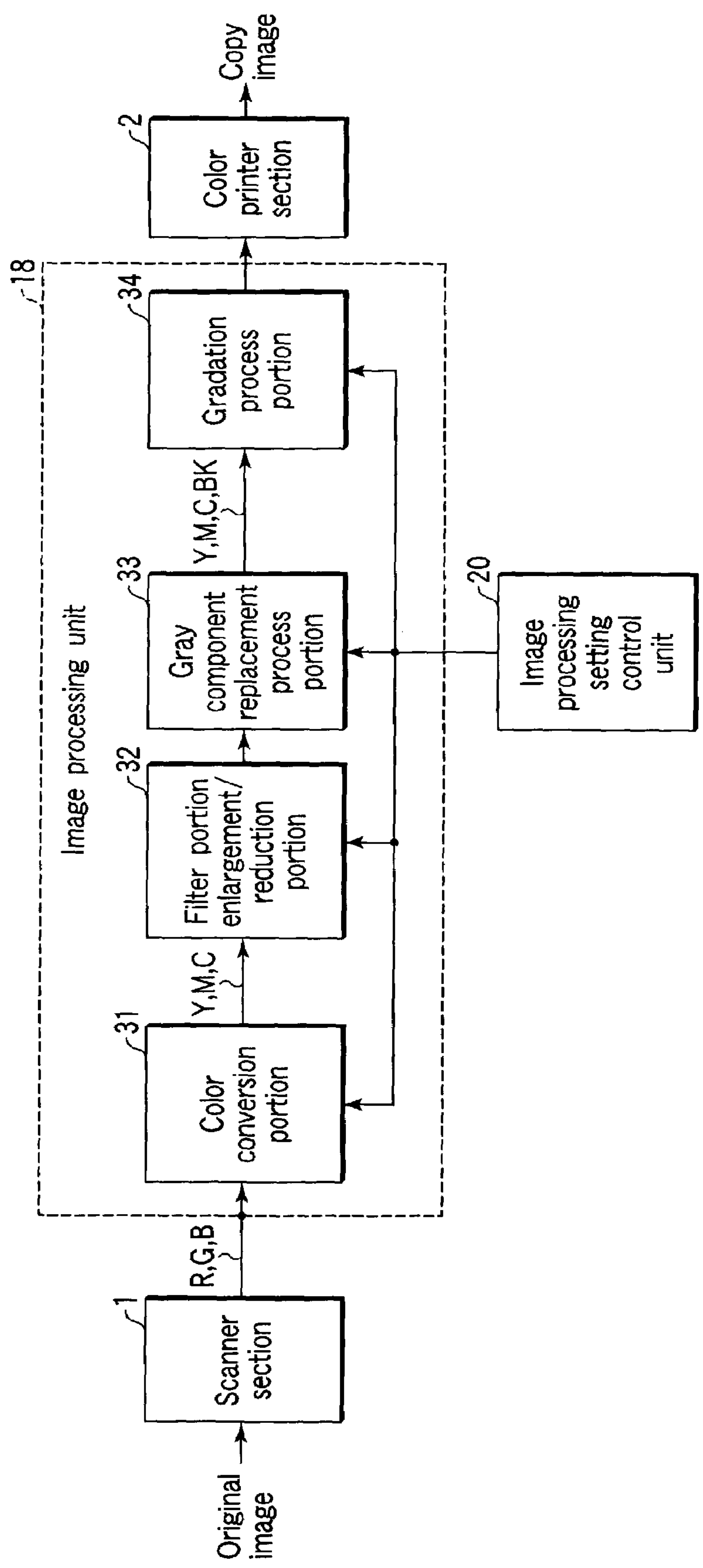
FIG. 2 is a block diagram showing a schematic constitution of an image processing unit.

FIGS. 1, 2 schematically show inner constitution blocks of the image forming apparatus such as the digital color copy machine which reads a color image on a original according to the present invention to form a duplicated image. The image forming apparatus is roughly constituted of: a color scanner section 1 as image read means for reading and inputting the color image on the original; a color printer section 2 as image formation means for forming the duplicated image of the inputted color image; a control section 3 which controls the whole image forming apparatus; and a control panel 4.

In the control panel 4, various settings are performed. For example, by a touch key input of a liquid crystal display unit 4*a*, type change of a original mode (photo mode, text mode, text/photo mode), adjustment of manual density adjustment, and image quality adjustment (e.g., hue adjustment, saturation adjustment, sharpness adjustment, color balance adjustment, RGB adjustment, one touch adjustment, and the like) are performed. Moreover, other settings of a copy sheet number can also be performed.

When the original mode is selected in accordance with the type of the original, the original can be copied with an optimum image quality. The original mode includes the photo mode, text mode, text/photo mode, and the like. The photo mode is selected with a photo original, the text mode is selected with a original including texts or texts and line drawings, and the text/photo mode is selected with a original in which the texts and photos exist in a mixed manner.

In the hue adjustment, when hue is changed, color shade is adjusted.

In the saturation adjustment, vividness of the whole copy is adjusted.

The sharpness adjustment is adjustment performed when thin lines of the texts or edges of images are to be emphasized.

In the color balance adjustment, a strong/weak level of each color of yellow Y, magenta M, cyan C, and black K is changed to adjust the whole color shade.

In the RGB adjustment, red R, green G, and blue B are adjusted.

In the one-touch adjustment, “warm”, “cool”, “vivid”, “clear” are adjusted with one touch.

In the control panel 4, an image quality adjustment input is possible such that a user’s desired image quality can be adjusted at a copy time, and set information can be guided (announced) with display and voice, and the panel includes input/display/voice portions.

The color scanner section 1 is constituted of a scanner CPU 10 which controls the whole, a ROM 11 in which control programs are stored, a RAM (not shown) for storing data, and a scanner mechanism unit 12.

The scanner mechanism unit 12 is constituted of an optical system which reads/scans the original, a movement mechanism which moves the optical system along a original base, a color image sensor into which a original image is guided by the optical system and which converts the image into an image signal for each color, and an image correction portion which corrects the image signal outputted from the color image sensor.

The color printer section 2 is constituted of a printer CPU 13 which controls the whole, a ROM 14 in which the control programs are stored, a RAM (not shown) for data storage, and a printer mechanism unit 15.

The printer mechanism unit 15 is constituted of a printer which performs print based on image data (Y, M, C, BK) for each color separated in an image processing unit 18 described later. Each printer is constituted of: a photosensitive drum as an image bearer; a charging apparatus which charges the surface of the photosensitive drum; an exposure apparatus including a semiconductor laser oscillator whose emission is controlled by image data (Y, M, C, BK) for each separated color to form an electrostatic latent image on the photosensitive drum; a developing apparatus which visualizes the electrostatic latent image on the photosensitive drum by a toner image; a conveyance mechanism which conveys a sheet as an image forming medium; a transfer apparatus which transfers the toner image on the photosensitive drum onto a sheet conveyed by the conveyance mechanism; and a fixing apparatus which thermally fixes the toner image transferred onto the sheet by the transfer apparatus.

The control section 3 is constituted of: a main CPU 16 which controls the whole; a read only memory (ROM) 17 in which the control programs are stored; the image processing unit 18 to subject image data which is inputted from the color scanner section 1 and whose color is separated into red (R), green (G), blue (B) to color conversion and filter process and subsequently to output print data to the color printer section 2; a NVRAM (nonvolatile random access memory: nonvolatile RAM) 19 as a nonvolatile memory backed up by a battery; an image processing setting control unit 20; and a monitor process unit 21. In the NVRAM 19, for example, a code in which a serviceman level can be adjusted is stored. The NVRAM 19 includes a set information data storage portion 19*a*, and monitor table 19*b*.

The image processing unit 18 can be switched in accordance with a parameter setting content from the image processing setting control unit 20.

The set information data storage portion 19*a* stores a set content of default such as the original mode and image quality adjustment at a copy process time.

For example, as the set content of default, the setting of the original mode, position of the hue adjustment, position of the saturation adjustment, position of the sharpness adjustment, position of the color balance adjustment, each position of RGB adjustment, position of the one-touch adjustment, and position of the background adjustment are stored.

The monitor table 19*b* stores the set information of the image quality adjustment for each copy job and the total of original mode switches.

Figure 3:
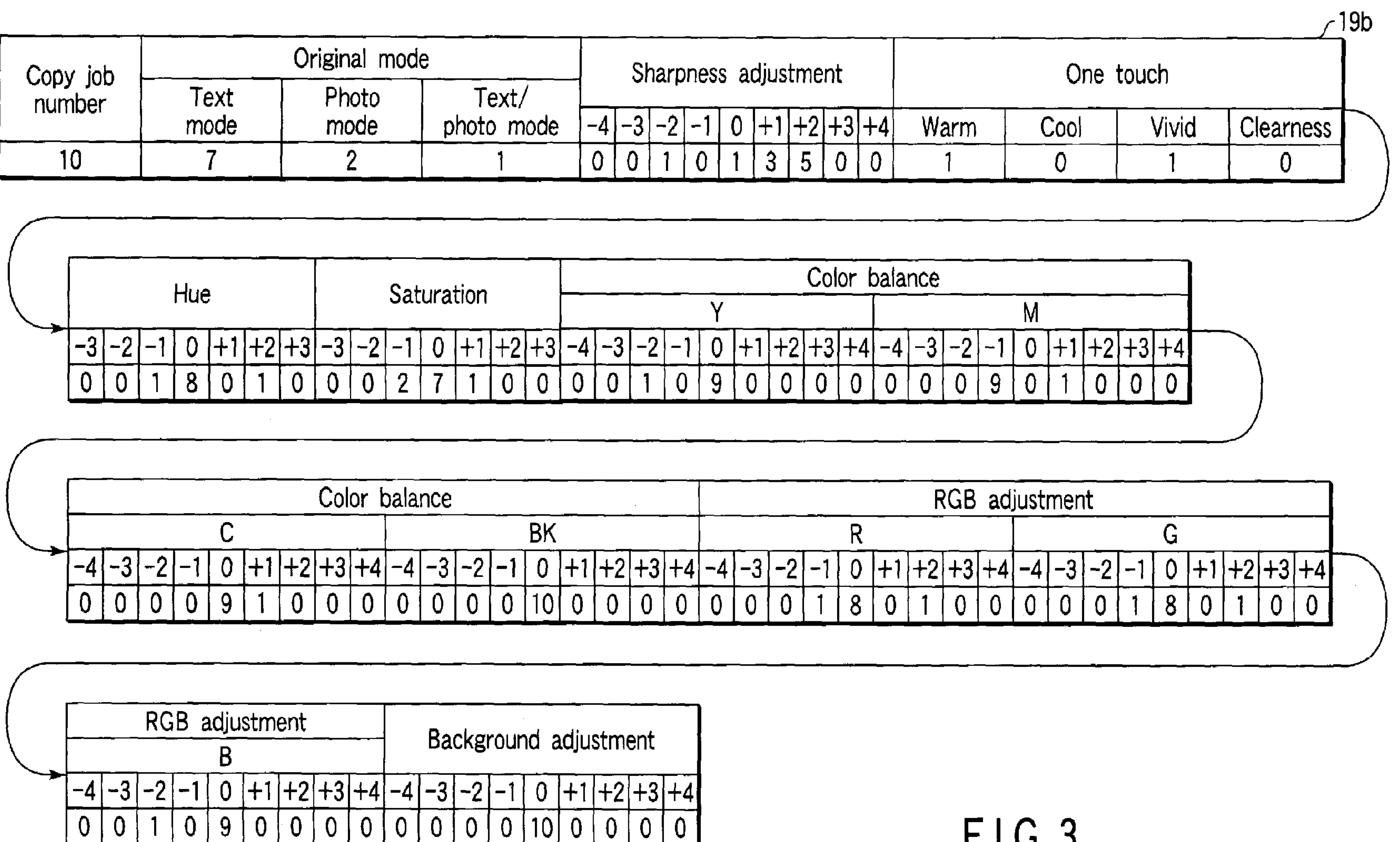
FIG. 3 is a diagram showing a storage example of a monitor table.

In the monitor table 19*b*, for example, as shown in FIG. 3, there are stored: a copy job number; the number of settings of each of the original modes including the text mode, photo mode, and text/photo mode; the number of settings of each position of the hue adjustment; the number of settings of each position of the saturation adjustment; the number of settings of each position of the sharpness adjustment; the number of settings of each position of the color balance adjustment; the number of settings of each position of the RGB adjustment; and the number of settings of each position of the one-touch adjustment and background adjustment.

The monitor process unit 21 monitors total sum information of the monitor table 19*b* and automatically updates the set content of default of the set information data storage portion 19*a* in accordance with preset judgment conditions.

The judgment conditions of the monitor process unit 21 are determined for each adjustment setting item on the control panel 4 in accordance with predetermined items which permit default update (e.g., the original mode, sharpness adjustment, hue adjustment, saturation adjustment, color balance (YMCK adjustment), RGB adjustment, one-touch adjustment, background adjustment), and a threshold value of the number of uses (total sum) of each predetermined set item.

Moreover, the monitor process unit 21 accumulates/adds the number of copy jobs of the monitor table 19*b* for each copy job, and also accumulates/adds the number of settings for each mode of the original mode as the item in which the default update is permitted, the number of settings for each value of the sharpness adjustment, the number of settings for each value of the hue adjustment, the number of settings for each value of the saturation adjustment, the number of settings for each value of the color balance (YMCK adjustment), the number of settings for each value of RGB adjustment, the number of settings for each value of the one-touch adjustment, and the number of settings for each value of the background adjustment in the set content for each copy job.

Moreover, when the number of copy jobs of the monitor table 19*b* reaches a predetermined number, the monitor process unit 21 judges the following set contents as new default values, and updates corresponding default process set values of the set information data storage portion 19*a*. The set contents include: any mode of the original modes whose number of settings (total sum) reaches the threshold value; any position of the hue adjustment positions whose number of settings (total sum) reaches the threshold value; any position of the saturation adjustment positions whose number of settings (total sum) reaches the threshold value; any position of the sharpness adjustment positions whose number of settings (total sum) reaches the threshold value; any position of the color balance adjustment positions whose number of settings (total sum) reaches the threshold value; any position of the RGB adjustment positions whose number of settings (total sum) reaches the threshold value; any position of the one-touch adjustment positions whose number of settings (total sum) reaches the threshold value; and any position of the background adjustment positions whose number of settings (total sum) reaches the threshold value.

For example, when the number of copy jobs of the monitor table 19*b* reaches "ten times", the monitor process unit 21 judges: any mode of the original modes whose number of settings reaches seven times; any position of the hue adjustment positions whose number of settings reaches five times; any position of the saturation adjustment positions whose number of settings reaches five times; any position of the sharpness adjustment positions whose number of settings reaches five times; any position of the color balance adjustment positions whose number of settings reaches five times; any position of the RGB adjustment positions whose number of settings reaches five times; any position of the one-touch adjustment whose number of settings reaches five times; and any position of the background adjustment positions whose number of settings reaches five times; as new default values which are different from the present default process set values, and updates the corresponding default process set values of the set information data storage portion 19*a*.

The process of the monitor process unit 21 may also be executed by the main CPU 16.

The image processing setting control unit 20 executes calculating/processing with functions for image processing based on the adjusted values corresponding to the set content of default stored in the set information data storage portion 19*a*. Moreover, the image processing setting control unit 20 sets the value of a processing result as a set value into a register of each image processing ASIC in the image processing unit 18.

Moreover, as not shown, the control section 3 includes: a RAM for temporarily storing the data; a shared RAM for use in bidirectional communication between the main CPU 16 and printer CPU 13; a page memory which includes a region capable of storing image information for a plurality of pages and which can be formed to store data obtained by compressing the image information from the color scanner section 1 for each page; and a page memory control unit which stores or reads the image information with respect to the page memory.

As shown in FIG. 2, the image processing unit 18 is constituted of: a color conversion portion 31 as color conversion means for converting the image data whose color is separated into red (R), green (G), blue (B) from the color scanner section 1 into each data of yellow (Y), magenta (M), cyan (C); a filter, enlargement/reduction process portion 32 which subjects the image data Y, M, C outputted from the color conversion portion 31 to processes such as enlargement, reduction, background removal, noise removal, and edge emphasis; a gray component replacement process portion 33 which subjects the image data Y, M, C outputted from the filter, enlargement/reduction process portion 32 to a gray component replacement process (correction process of black color); and a gradation process portion 34 which subjects the image data of Y, M, C, BK (black) outputted from the gray component replacement process portion 33 to a gradation process.

Each portion of the image processing unit 18 is constituted of an image processing ASIC. By control of parameter setting from the image processing setting control unit 20, the setting of the process operation is switched with respect to each image processing ASIC so that an image quality can be changed.

Figure 4:
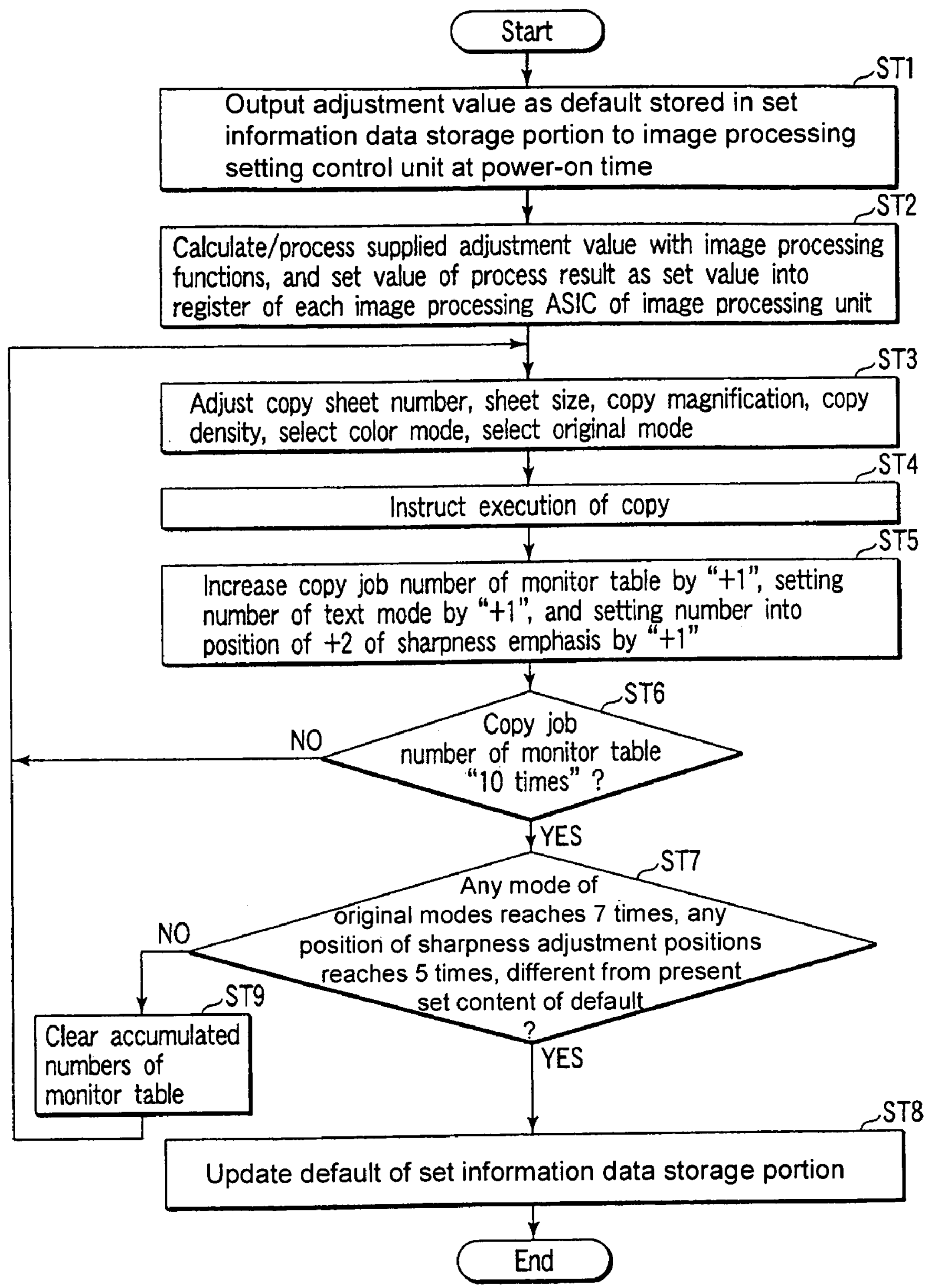
FIG. 4 is a flowchart showing an operation of a major part of a copy process.

A major part of a copy process in the above-described constitution will next be described with reference to a flowchart shown in FIG. 4.

First, the main CPU 16 outputs the set content (corresponding adjustment value) of default stored in the set information data storage portion 19*a* to the image processing setting control unit 20 at a power-on time (ST1). Then, the image processing setting control unit 20 calculates/processes the adjustment value in accordance with the supplied set content of default with image processing functions, and sets the value of this process result as a set value into the register of each image processing ASIC of the image processing unit 18 (ST2).

In this state, the user uses the control panel 4 to adjust copy sheet number, sheet size, copy magnification, and copy density and to select color mode and original mode (ST3).

Figure 5:
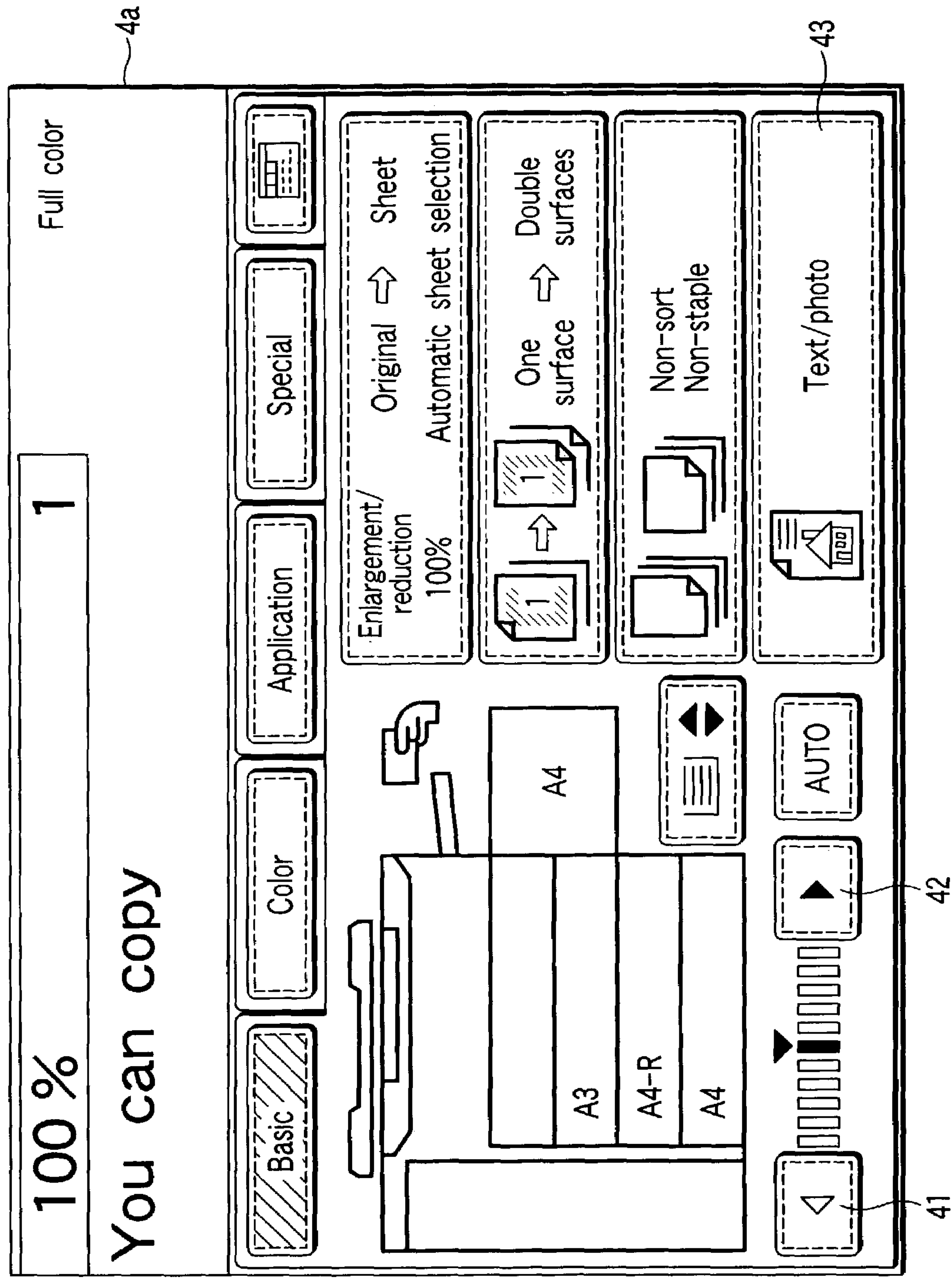

For example, by inputs of density buttons (+ side, − side) 41, 42 of a basic menu screen of the liquid crystal display unit 4*a* shown in FIG. 5, a density adjustment value can be set every five stages on the "+" or "−" side centering on zero.

Figure 6:
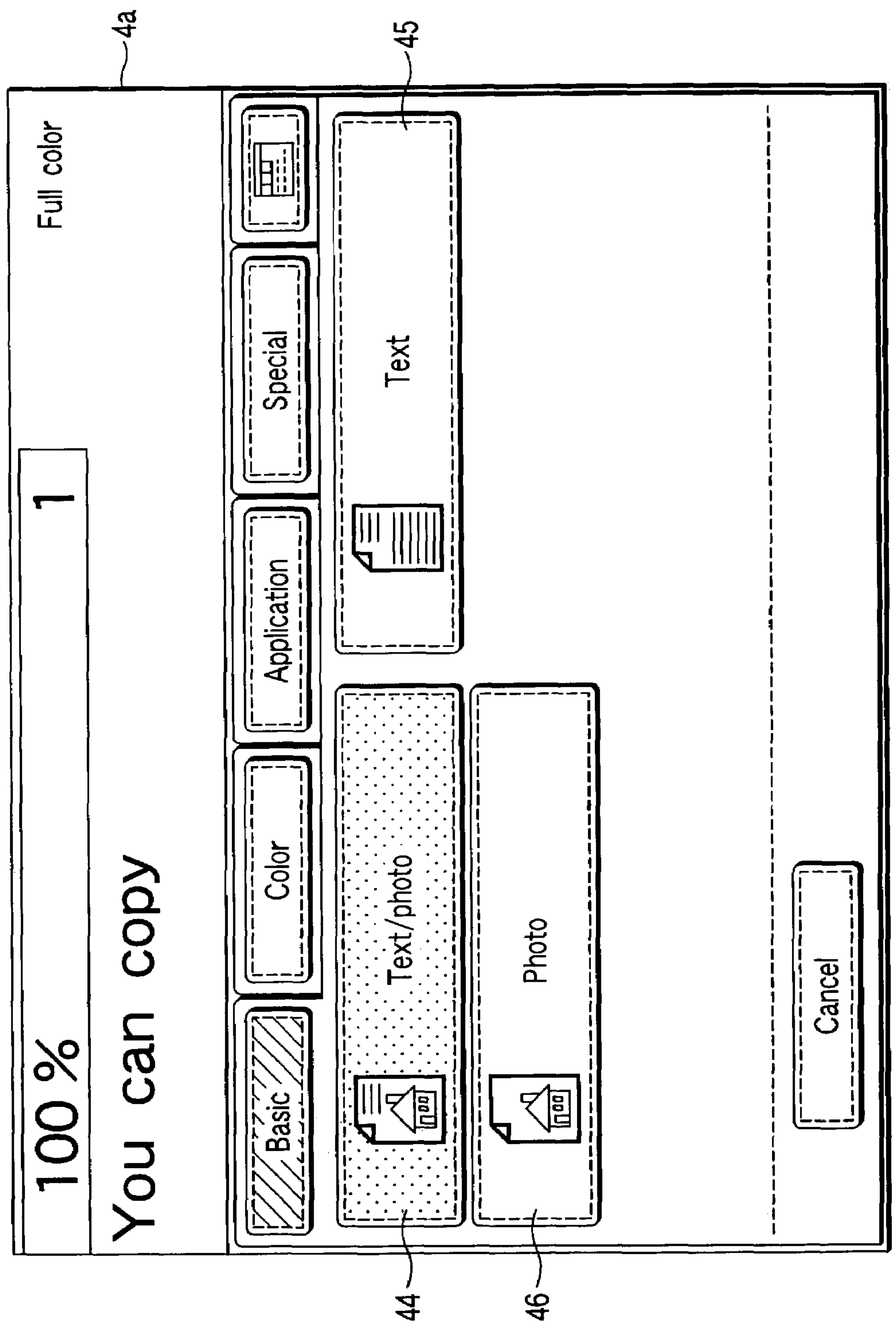

Moreover, by an input of a text/photo button 43 of the basic menu screen of the liquid crystal display unit 4*a*, as shown in FIG. 6, a setting screen of the original mode is displayed. By the display, a text/photo button 44, text button 45, and photo button 46 are displayed. By the display, a original in which texts and printed photos exist in a mixed manner is set by the input of the text/photo button 44, a original including only the texts is set by the input of the text button 45, and the original of the photo is set by the input of the photo button 46.

Figure 7:
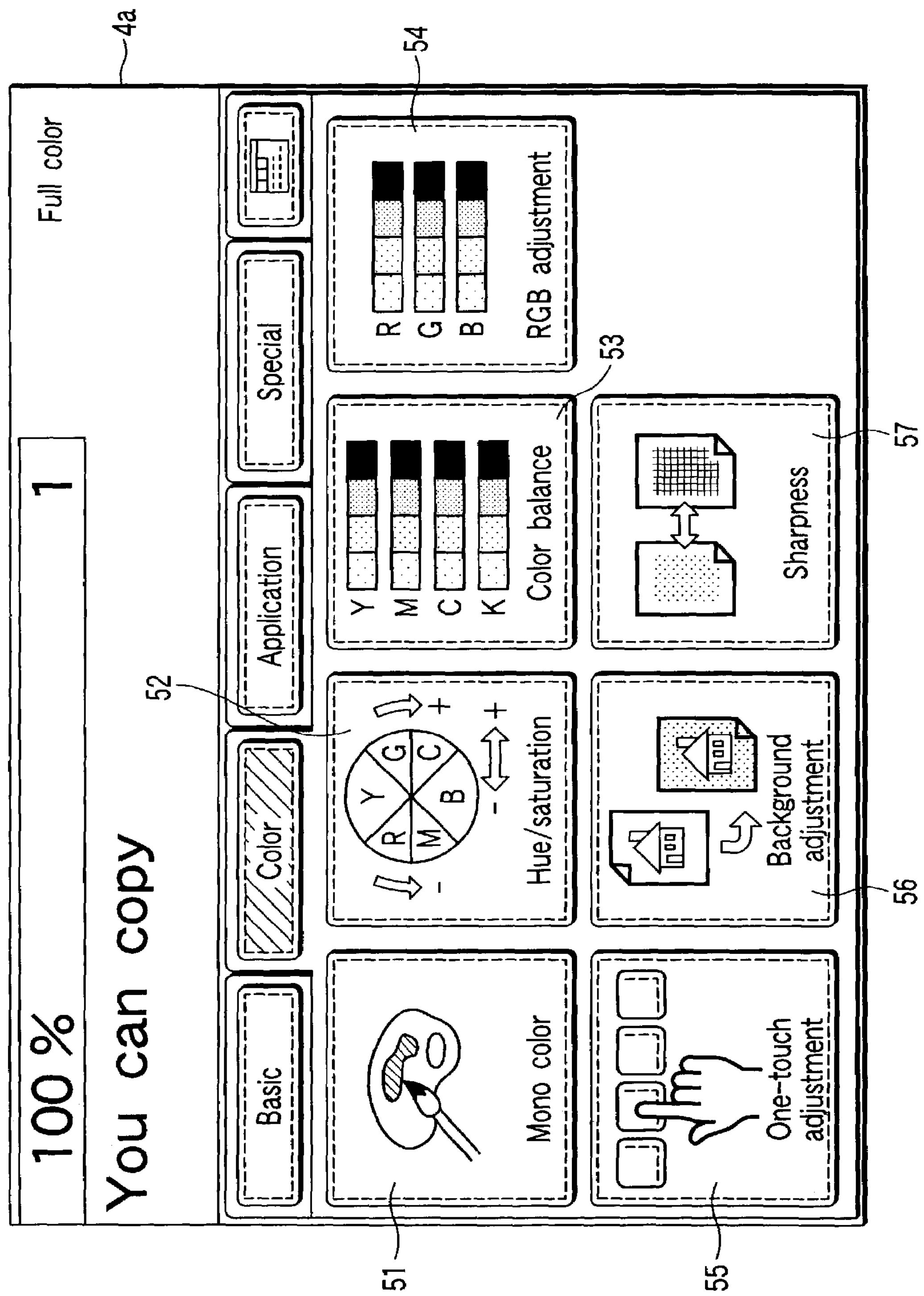

Moreover, when a color button is depressed, a color menu screen is displayed as shown in FIG. 7. In this case, a mono color button 51, hue/saturation button 52, color balance button 53, RGB adjustment button 54, one-touch adjustment button 55, background adjustment button 56, and sharpness button 57 are displayed.

In this color menu screen, by the input of the mono color button 51, a monosaturated selection screen is displayed, and one color can be selected.

Figure 8:
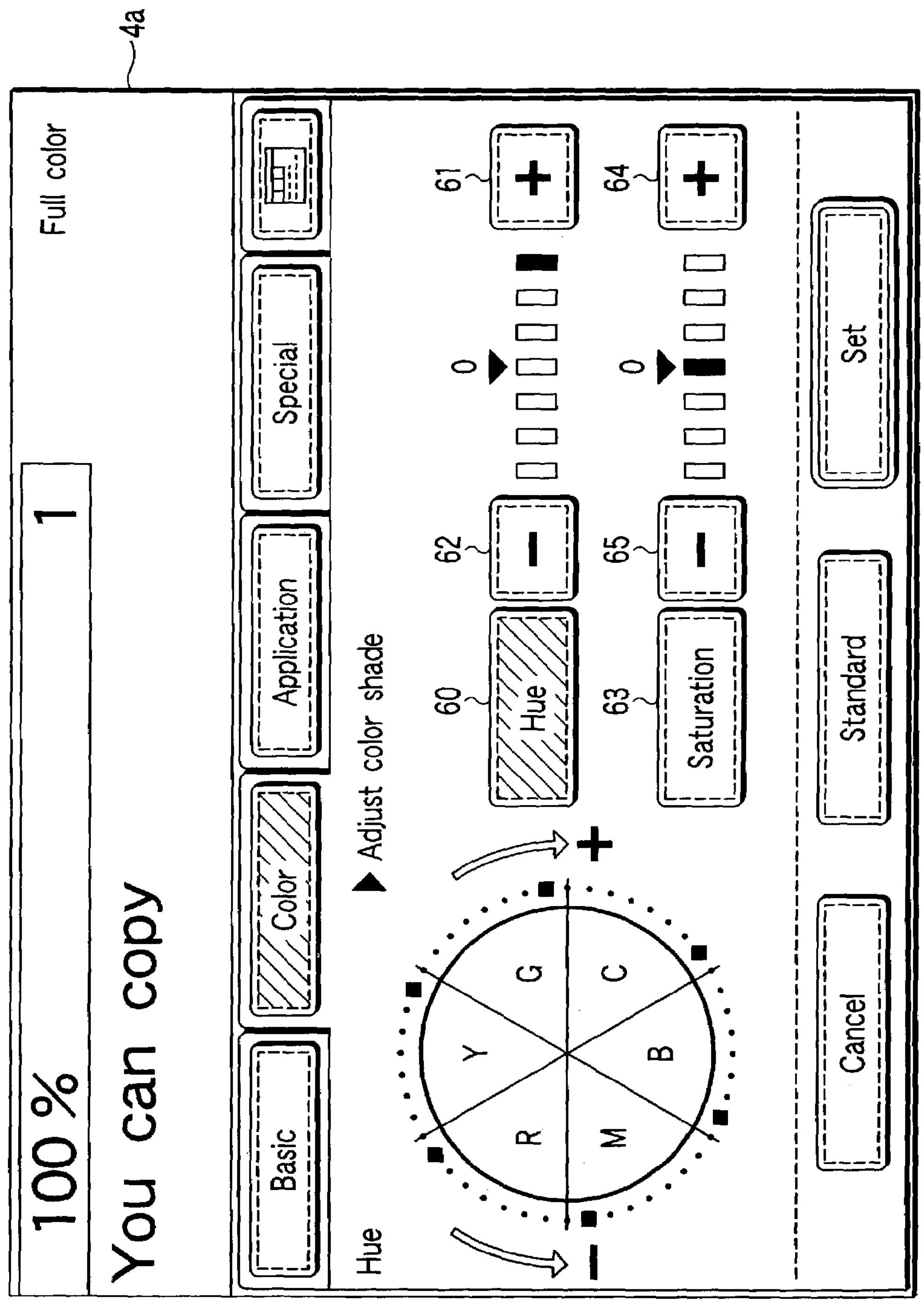

Moreover, in the color menu screen, by the input of the hue/saturation button 52, as shown in FIG. 8, a hue button 60 is lit and a hue setting screen is displayed. By this display, the setting is possible every three stages on the "+" or "−" side centering on zero by the inputs of setting buttons of the hue (+ side, − side) 61, 62.

Figure 9:
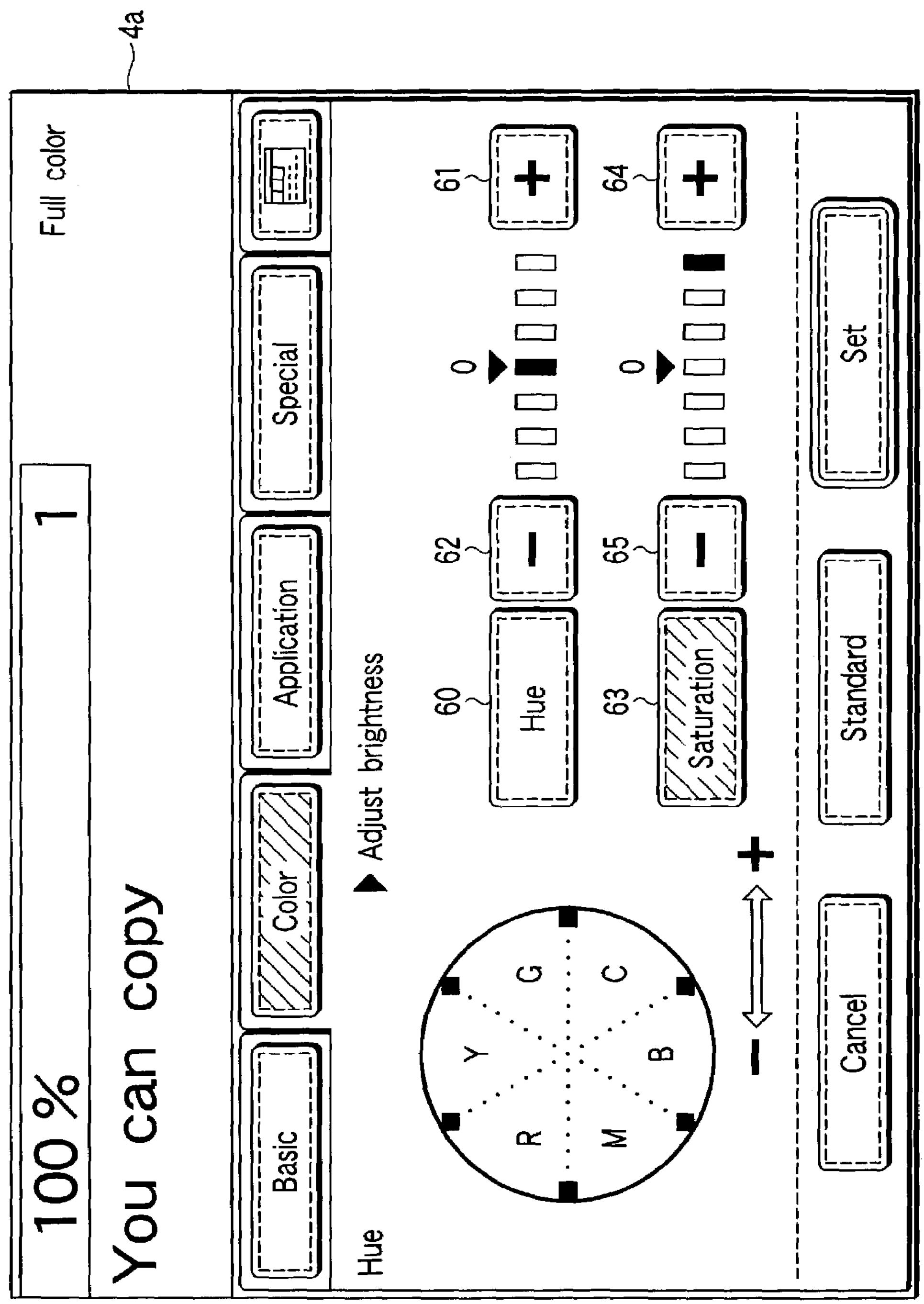

Moreover, in the setting screen of the hue, by the input of a saturation button 63, as shown in FIG. 9, the saturation button 63 is lit and the setting screen of the saturation is displayed. By this display, the setting is possible every three stages on the "+" or "−" side centering on zero by the inputs of setting buttons of the saturation (+ side, − side) 64, 65.

Furthermore, in the color menu screen, by the input of the color balance (YMCBK adjustment) button 53, as shown in FIG. 10, the setting screen of the color balance is displayed. By this display, each color (Y, M, C, BK) of the color balance can be set every four stages on the "+" or "−" side centering on zero by the inputs of setting buttons of the color (+ side, − side) 66, 67.

Figure 11:
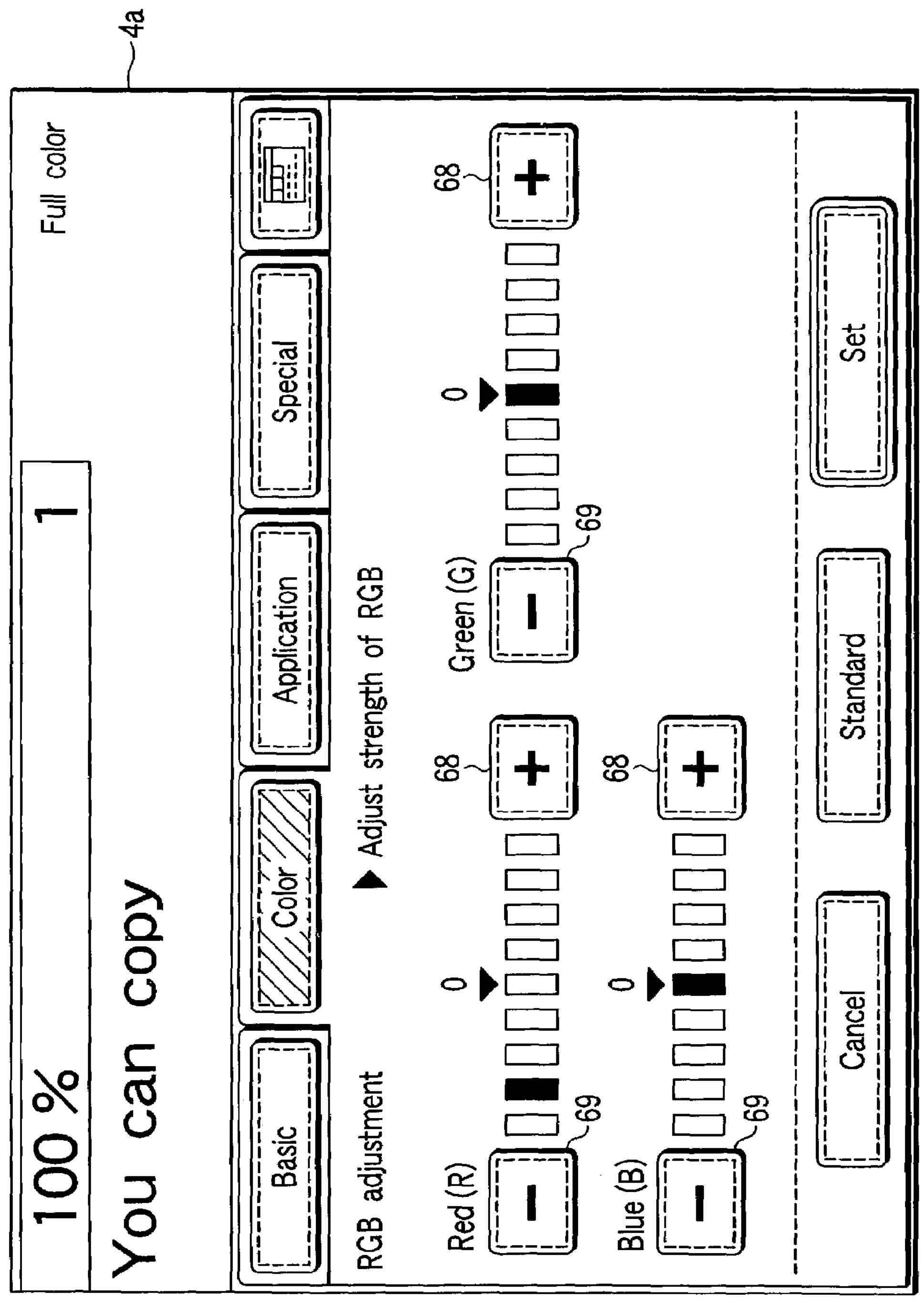

Additionally, in the color menu screen, by the input of the RGB adjustment button 54, as shown in FIG. 11, the setting screen of RGB is displayed. By this display, the setting is possible every four stages on the "+" or "−" side centering on zero by the inputs of setting buttons of the respective colors R, G, B (+ side, − side) 68, 69.

Figure 12:
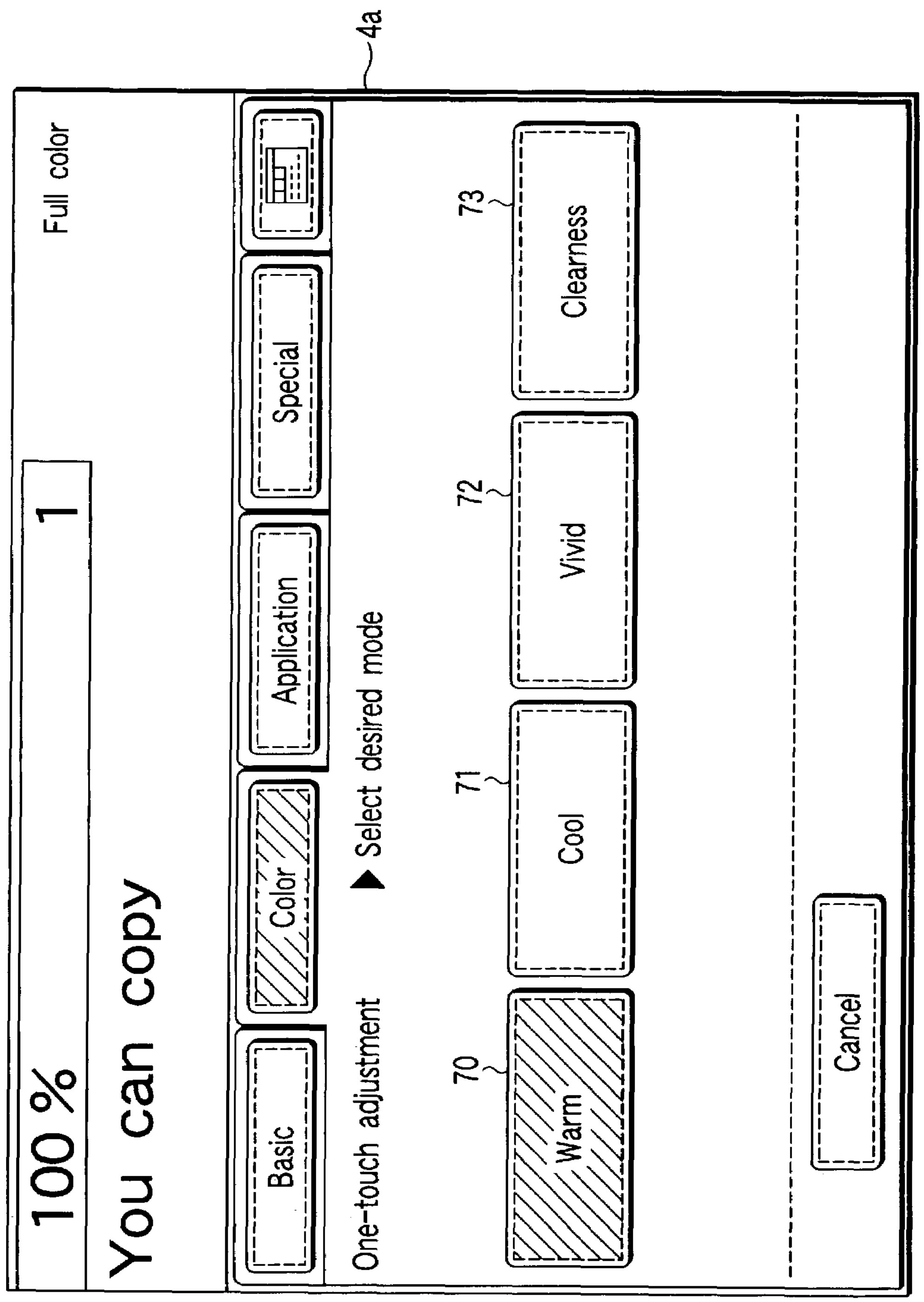

Moreover, in the color menu screen, by the input of the one-touch adjustment button 55, as shown in FIG. 12, the setting screen of the one-touch adjustment is displayed. By this display, by the inputs of a "warm" button 70, "cool" button 71, "vivid" button 72, and "clearness" button 73, four-stages setting is possible.

Figure 13:
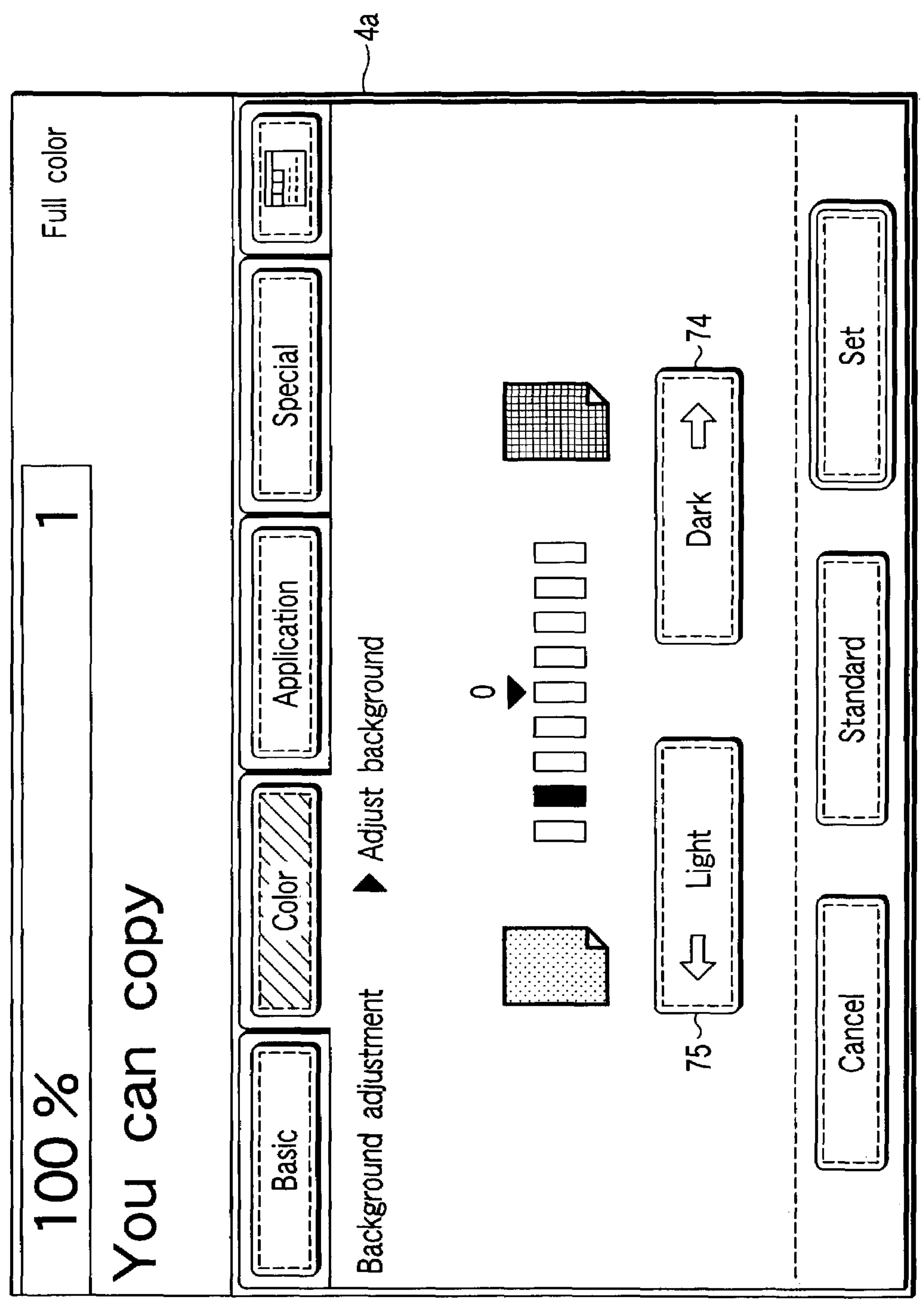

Furthermore, in the color menu screen, by the input of the background adjustment button 56, as shown in FIG. 13, the setting screen of the background adjustment is displayed. By this display, by the input of a "dark" button 74, "light" button 75 in accordance with the density of background, the display can be set to be dark or light every four stages centering on zero.

Figure 14:
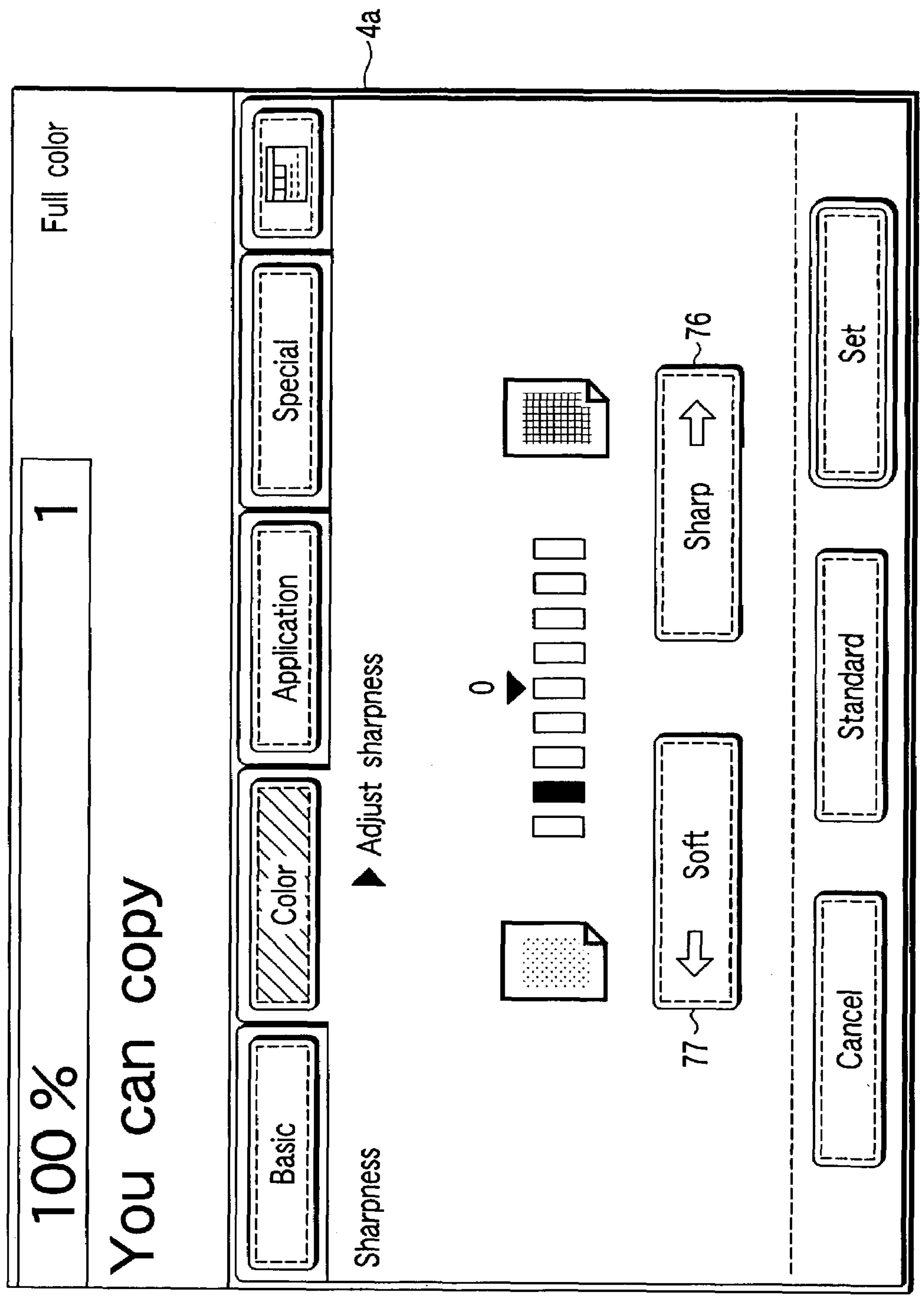

Additionally, in the color menu screen, by the input of the sharpness button 57, as shown in FIG. 14, the setting screen of the sharpness adjustment is displayed. By this display, by the input of a "sharp" button 76, "soft" button 77, the display can be set to be sharp or soft every four stages centering on zero.

For example, the copy job is set to change the original mode to the text mode, the density adjustment value to the position of manual +3, and the sharpness adjustment to the position of +2.

After selectively performing various settings, a copy key is depressed to instruct execution of the copy (ST4).

In this case, the monitor process unit 21 increases the copy job number of the monitor table 19*b* by "+1", increases the setting number of the text mode by "+1", and increases the setting number into the position of +2 of the sharpness adjustment by "+1" (ST5).

Thereafter, the copy corresponding to the copy job is similarly performed, and the stored content of the monitor table 19*b* is also updated (ST3 to 5).

Subsequently, when the copy job number of the monitor table 19*b* reaches "10 times", the monitor process unit 21 judges any mode of the original modes whose number of settings reaches seven times and any position of the sharpness adjustment positions whose number of settings reaches five times, which are different from the present set content of default; as new setting of defaults (ST7), and updates the corresponding set content of defaults of the set information data storage portion 19*a* (ST8).

For example, when seven text modes are achieved, five positions of +2 are achieved as the position of the sharpness adjustment, and these numbers are different from the present set content of default, the monitor process unit 21 updates the set content of default of the set information data storage portion 19*a*.

After this update, or when the new setting of default is not judged by the step 7, the monitor process unit 21 clears the accumulated numbers of the monitor table 19*b* (ST9), and returns to step 3 to process the next copy job as a first time.

Thereafter, every time ten copy jobs are achieved, or when there is setting of seven times reached in each mode of the original mode or setting of five times reached in each position of the sharpness adjustment, different from the present set content of default, the monitor process unit 21 updates the corresponding set content of default of the set information data storage portion 19*a* as described above.

Moreover, after the corresponding set content of default of the set information data storage portion 19*a* is updated and power is turned on, the updated set content of default stored in the set information data storage portion 19*a* is outputted to the image processing setting control unit 20 (ST1). Then, the image processing setting control unit 20 calculates/processes the adjustment value based on the supplied set content of default with image processing functions, and sets the value of the process result as the set value into the register of each image processing ASIC of the image processing unit 18 (ST2).

That is, after the update of the set content of default and at the next power-on time, the value is used as the value of the processing set mode of default.

Furthermore, when the set content of default is updated by the judgment of the monitor process unit 21, the control panel 4 may announce (guide) voice or display in order to confirm the update.

Figure 15:
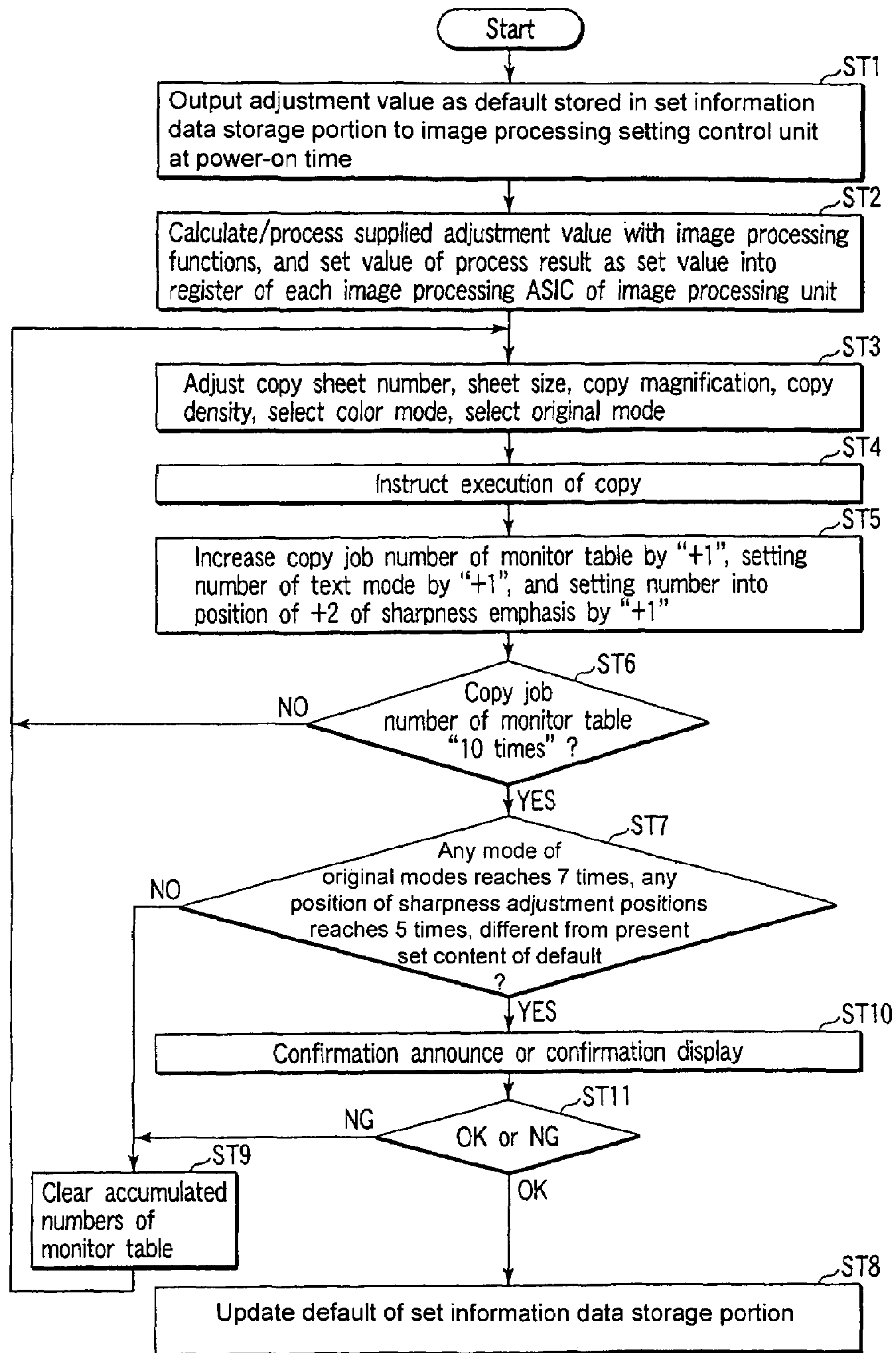
FIG. 15 is a flowchart showing the operation of the major part of the copy process.

In this case, as shown in FIG. 15, step 10 of confirmation announcement or confirmation display and step 11 of key input to indicate OK by the user are added between the steps 7 and 8. With the key input with which the user indicates NG by the confirmation announcement, after clearing the accumulated numbers of the monitor table 19*b*, the process returns to the step 3.

Moreover, as another example, it is also possible to change to another process mode as an adaptive process by the information accumulated in the monitor process unit 21. For example, as the process conditions of the monitor process unit 21, when the frequency of photo modes satisfy the conditions, the value of application process setting is prepared as another management value of the set information data storage portion 19*a* without directly updating the value of the set information data storage portion 19*a* corresponding to the original mode. Thereby, it is also possible to change a parameter of process in which reproduction of a photo part in the text/photo mode is prioritized to a selectable corresponding value without changing the original mode.

Furthermore, the update is displayed or announced before copy start, and a notice as to whether there is a problem in the copy in the present setting process mode is informed. This assist function can prevent copy mistake.

As described above, by the monitor process unit 21 which accumulates and holds use information obtained by changing the setting of the original mode or image quality adjustment on the user's control panel for each item to manage the data, the content (e.g., original mode, sharpness adjustment, and the like) which is allowed beforehand to be updated in accordance with the content of the monitor process unit 21 is judged by a use number (total sum) and data value of the set information data storage portion 19*a* is automatically updated as the default process setting mode so that the data can be reflected in the process mode at a start time of the copy machine.

Thereby, the mode can automatically be updated to a suitable default process setting mode for each user, and an appropriate image can be reproduced without changing the image adjustment setting before the copy with respect to the major user.

Furthermore, the assist function to inform the notice as to whether there is a problem in the copy in the present setting process mode by the display or announcement before the copy start can prevent the copy mistake.

For example, the default state may also be displayed as each button display, when the color menu screen is displayed by the input of the color button in the above-described step 3.

Second Embodiment

As a second embodiment, for the setting of the item which permits the default update managed by the image forming, copy job unit, and threshold value by the use number for each item, addition/deletion of the associated management value of the set information data storage portion 19*a*, download change for upload of the value and correction of the value, and further the setting of a process parameter set into the image processing of the image processing setting control unit 20, the data can be transmitted/received by LAN and PHS so that a remote maintenance function of the image quality is possible.

Figure 16:
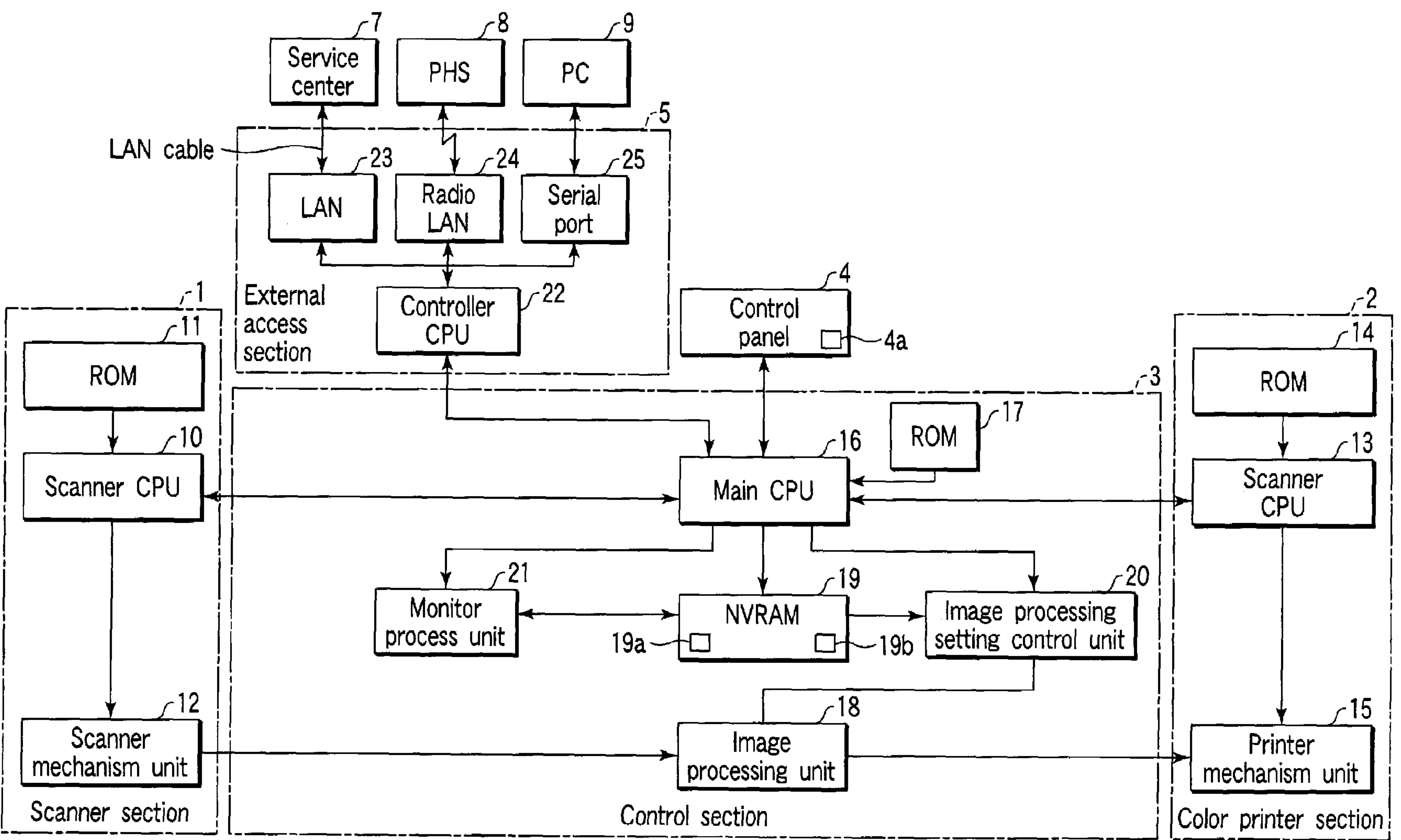

As shown in FIG. 16, this case can be realized, when an external access section 5 is added to the control circuit of FIG. 1.

The external access section 5 is constituted of a controller CPU 22 which controls the whole of the access section, LAN interface 23, radio LAN interface 24, and serial port 25. The LAN interface 23 is connected to connected to a terminal (remote monitor) 7 of a service center in a remote area via a LAN cable. The radio LAN interface 24 is connected to a PHS 8 connected via a communication line. The serial port 25 is connected to a personal computer (PC) 9 for maintenance by a service man.

The controller CPU 22 is connected to the main CPU 16, exchange of data is performed between the controller CPU 22 and main CPU 16, and data from the terminal 7 of the service center 7, PHS 8, PC 9 is downloaded into the control section 3 or collected data in the control section 3 is uploaded onto the terminal of the service center 7, PHS 8, PC 9 under the control by the controller CPU 22.

The controller CPU 22 controls the LAN interface 23, radio LAN interface 24, and serial port 25, so that access control with external apparatuses such as the terminal 7, PHS 8, and PC 9 can be performed.

For example, the controller CPU 22 receives the data for the update from the terminal 7, converts the data to the data for use in the control section 3, and transmits the data so that the main CPU 16 can be operated in a state equivalent to a usual input from the control panel 4.

Moreover, the controller CPU 22 can directly and forcibly change the value of the default process setting mode of the set information data storage portion 19*a* in the NVRAM 19, or change the process conditions of the monitor process unit 21.

Furthermore, the main CPU 16 may also accumulate/store the set content of the copy job unit in the NVRAM 19, or the change content of the value of the default process setting mode.

Additionally, the controller CPU 22 takes up the set content of the copy job unit accumulated/stored in the NVRAM 19, and the change content of the value of the default process setting mode, so that the contents can be transmitted to the external apparatuses such as the terminal 7 of the service center, PHS 8, and PC 9.

Thereby, the terminal 7 of the service center (PHS 8, PC 9) takes up the data registered by the control section 3, and can thereby compile customer's data such that the use frequency requiring the change and the image quality to be changed can be estimated.

The compiled data can be used to judge the image quality to be set in the apparatus to be supplied to each customer.

Third Embodiment

As a third embodiment, the corresponding value of the set information data storage portion is separately set in order to manage the use of the process conditions of the monitor process unit every unit of a plurality of users or groups, so that the default process setting mode can be switched by a use management unit to automatically update the default process setting mode.

In this case, first, users who use this apparatus and similar to one another in the image quality adjustment are grouped for each department, and a management number is given to each department. Moreover, the same part as that of the first embodiment is denoted with the same reference numerals and the description thereof is omitted. Thereby, as shown in FIG. 17, the set information data storage portion 19*a*, monitor table 19*b*, and monitor process unit 21 are replaced with a set information data storage portion 82, monitor table 80, and monitor process unit 81.

Thereby, a plurality of set contents of defaults are stored in the set information data storage portion 82.

The set information of the image quality adjustment at the copy time for each management number and the total sum of the original mode switches for each mode are stored in the monitor table 80.

In the monitor table 80, for example, as shown in FIG. 18, there are stored: the management number; copy job number; the number of settings of each of the original modes including the text mode, photo mode, and text/photo mode; the number of settings of each position of the hue adjustment; the number of settings of each position of the saturation adjustment; the number of settings of each position of the sharpness adjustment; the number of settings of each position of the color balance adjustment; the number of settings of each position of the RGB adjustment; and the number of settings of each position of the one-touch adjustment and background adjustment.

The monitor process unit 81 monitors the total sum information of the monitor table 80 for each management number and automatically updates the set information of the set information data storage portion 82 in accordance with the preset judgment conditions.

That is, the monitor process unit 81 monitors the corresponding value of the monitor table 80 for each management number, and updates the values (values for managing the type of the original mode and the adjustment position of the image quality adjustment) associated with the default process setting mode of the set information data storage portion 82, when the process conditions of each management number are applicable.

Figure 19:
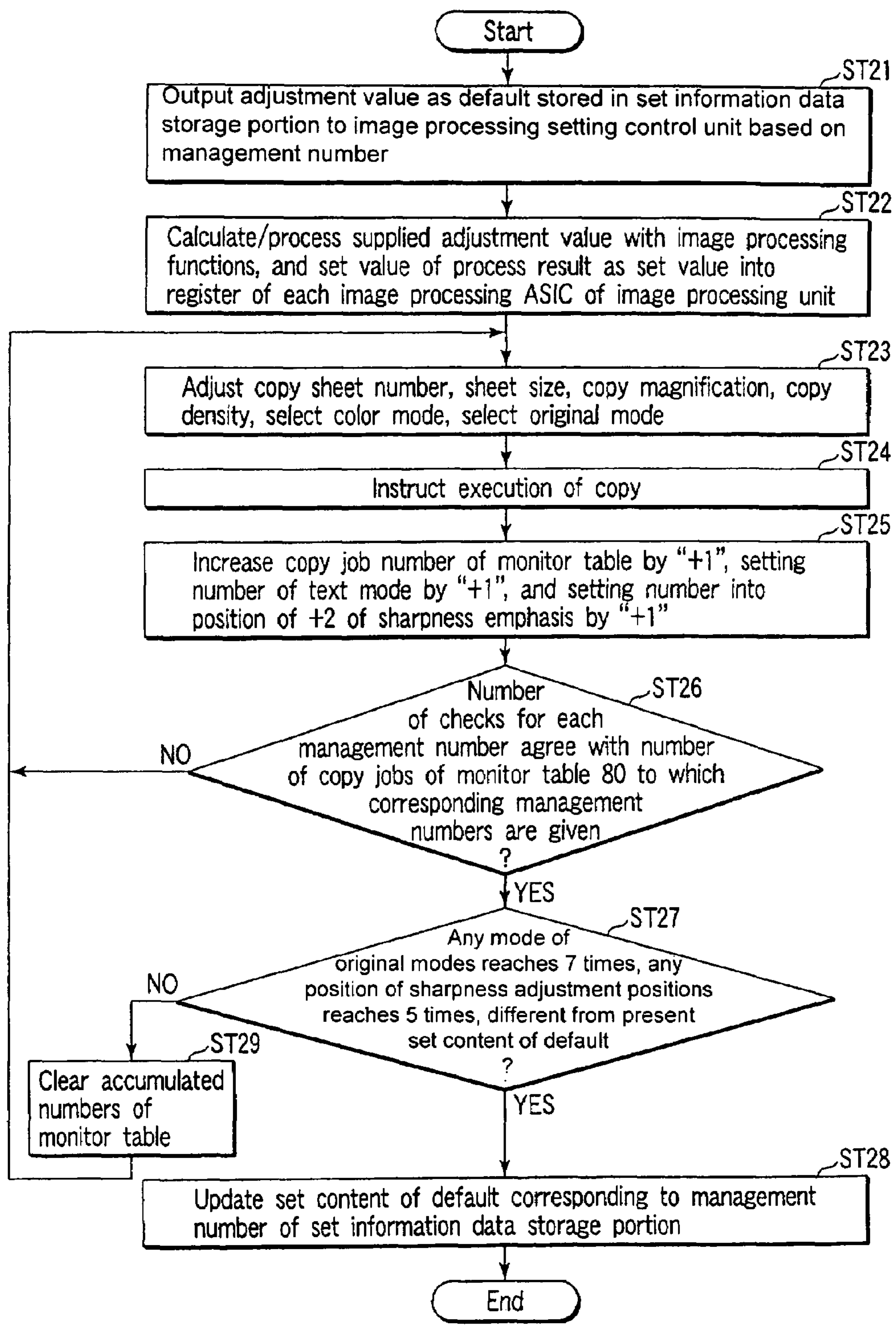
FIG. 19 is a flowchart showing an operation of the major part of the copy process.

The major part of the copy process in the above-described constitution will next be described with reference to a flowchart shown in FIG. 19.

That is, at a copy start time, the user uses the control panel 4 to input the management number. Then, the main CPU 16 outputs the adjustment value as the associated value of the process setting mode of default stored in the set information data storage portion 82 to the image processing setting control unit 20 based on the management number (ST21). Then, the image processing setting control unit 20 calculates/processes the supplied adjustment value in accordance with the image processing functions, and sets the value of this process result as the set value into the register of each image processing ASIC of the image processing unit 18 (ST22).

In this state, the user uses the control panel 4 to adjust the copy sheet number, sheet size, copy magnification, and copy density and to select the color mode and original mode (ST23).

Figure 20:
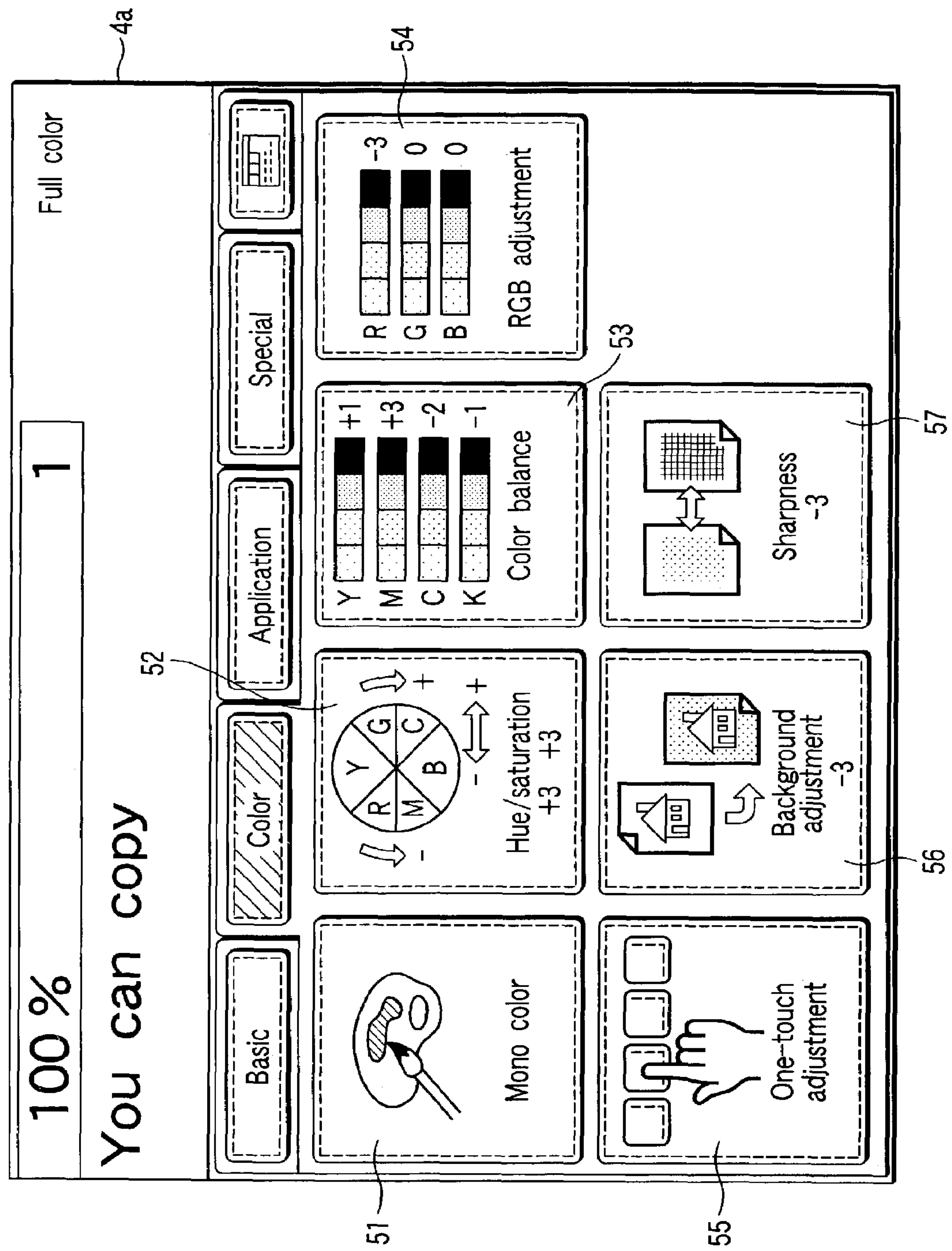
FIG. 20 is a diagram showing the display example of the liquid crystal display unit.

In this case, when the color menu screen is displayed by the input of the color button, as shown in FIG. 20, the default state (based on the above-described management number) is displayed as each button display. Thereby, the present image quality adjustment state can be known.

After selectively performing various settings, the copy key is depressed to instruct the execution of the copy (ST24).

In this case, the monitor process unit 81 increases the copy job number of the management number of the monitor table 80 by "+1", and increases the corresponding setting number by "+1" with the selection of the color mode or original mode (ST25).

Thereafter, the copy corresponding to the copy job is similarly performed, and the stored content of the monitor table 80 is also updated based on the management number (ST23 to 25).

Subsequently, when the number of checks of each management number agrees with the number of copy jobs having the corresponding management number of the monitor table 80 (ST26), the monitor process unit 21 judges any mode of the original modes whose number of settings reaches seven times and any position of the sharpness adjustment positions whose number of settings reaches five times, which are different from the present set content of default; as new setting of defaults (ST27), and updates the corresponding set content of defaults of the set information data storage portion 19*a* (ST28).

For example, when seven text modes are achieved, and five positions of +2 are achieved as the position of the sharpness adjustment, the monitor process unit 21 updates the value associated beforehand with the text mode as the value of the original mode of the set information data storage portion 19*a* to a new value only with respect to the adjustment value of the position of +2 as the position of the sharpness adjustment.

After this update, or when the new default value is not judged by the step 7, the monitor process unit 21 clears the accumulated numbers of the monitor table 19*b* (ST29), and returns to step 23 to process the next copy job as a first time.

Thereafter, every time ten copy jobs having management number "0001" are achieved, and when seven times are achieved in each mode of the original mode and five times are achieved in each position of the sharpness adjustment, the corresponding default process set value of the set information data storage portion 19*a* is updated as described above.

As described above, with the monitor process unit 21 which manages the user use information by the use management unit, better image quality management can be achieved as the image quality conditions in the use in a plurality of departments or in the use of each operation group.

Moreover, the setting of the set conditions and setting process mode can be performed by transmission/reception of the data by the remote maintenance function via LAN and PHS, so that the set conditions are downloaded, the set frequency data of the setting process mode is uploaded, and thereby the conditions and data can be used in image quality demand check of each user.

Figure 21:
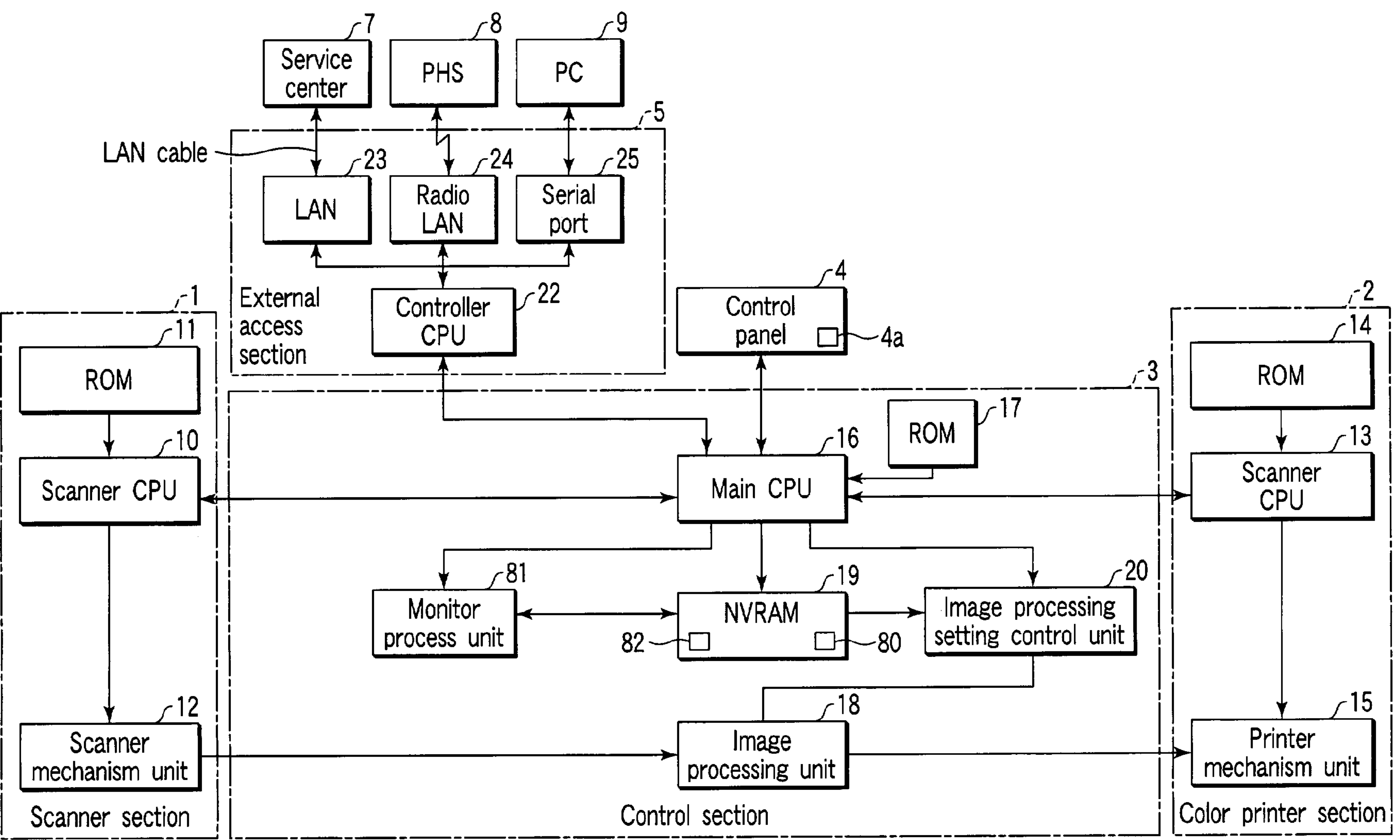
FIG. 21 is a block diagram showing a schematic constitution of the image forming system.

As shown in FIG. 21, this case can be realized by the external access section 5 added to the control circuit of FIG. 16 as in the second embodiment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An image forming apparatus which performs image-forming processing for forming an image on an image forming medium, the image forming apparatus comprising:

- a first storage unit which stores a default set value regarding settings of the image-forming processing according to identification information for specifying a group;
- an identification information input unit for inputting the identification information;
- a setting unit which configures the settings of the image-forming processing based on the default set value stored in the first storage unit corresponding to the identification information input by the identification information input unit;
- an operation unit for instructing changes in the settings based on the default set value which was set by the setting unit;
- a setting change unit which changes the settings of the image-forming processing based on the changes instructed by the operation unit;
- a second storage unit which stores information representing the settings changed by the setting change unit, and the number of times the image-forming processing has been performed for each group specified by the identification information; and
- an updating unit which updates the default set value of the group based on the settings stored in the second storage unit, in the case where the number of executions of the image-forming processing for the group stored in the second storage unit reached a predetermined number.

2. The image forming apparatus according to claim 1, wherein the operation unit has a button for instructing the change in one of a source document mode, hue, color saturation, sharpness, color balance and adjustment value for each color.

3. The image forming apparatus according to claim 1 further comprising a color conversion unit which converts a color signal of a color image to a different color signal based on a color conversion parameter, wherein the operation unit has a button for instructing a change in the color conversion parameter performed by the color conversion unit.

4. The image forming apparatus according to claim 1 further comprising a gradation process unit which performs gradation correction of an image based on various parameters, wherein the operation unit has a button for changing a parameter for the gradation correction by the gradation process unit.

5. The image forming apparatus according to claim 4 further comprising a filter unit which performs filter processing based on frequency characteristics which sets the image data, wherein the operation unit has a button for instructing a change in the frequency characteristics set in the filter section.

6. The image forming apparatus according to claim 1, further comprising a notification unit which informs that the default set value has been changed when the identification information of a group whose default set value has been changed by the updating unit is input to the identification information input unit.

7. The image forming apparatus according to claim 1 further comprising:

a communication unit for performing data communication with an external device; and a second updating unit which updates, when the communication unit receives the identification information and a request for changing the default set value from the external device, the default set value of the group specified by the received identification information of the default set values stored in the first storage unit, in accordance with the data on changes received from the external device.

8. The image forming apparatus according to claim 1 further comprising:

a third storage unit which stores information representing the changes of the default set value updated by the updating unit for each group; and a communication unit which transmits the information representing the changes of the default set value for each group stored in the third storage unit to an external device.

9. The image forming apparatus according to claim 1 further comprising:

a third storage unit which stores the settings changed by the setting change unit in an accumulative way for each group; and a communication unit which transmits the accumulative information on the changed settings of each group stored in the third storage unit to an external device.

10. An image forming apparatus which performs image-forming processing for forming an image on an image forming medium, the image forming apparatus comprising:

a first storage unit which stores a default set value regarding settings of the image-forming processing according to identification information for specifying a group;

an identification information input unit for inputting the identification information;

a setting unit which configures the settings of the image-forming processing based on the default set value stored in the first storage unit corresponding to the identification information input by the identification information input unit;

an operation unit for instructing changes in the settings based on the default set value which was set by the setting unit;

a setting change unit which changes the settings of the image-forming processing based on the changes instructed by the operation unit;

a second storage unit which stores information representing the settings changed by the setting change unit, and the number of times the image-forming processing has been performed for each group specified by the identification information;

an updating unit which updates the default set value of the group in which the number of executions of the image-forming processing stored in the second storage unit reached a predetermined number, based on the settings stored in the second storage unit;

a color conversion unit which converts a color signal of a color image to a different color signal based on a color conversion parameter, wherein the operation unit instructs a change in the color conversion parameter performed by the color conversion unit; and a reading unit which reads an image on a source document as image data consisting of each of color signals R, G, and B, wherein the color conversion unit converts the image data consisting of each of the color signals R, G, and B read by the reading unit into image data consisting of each of color signals C, M, and Y, based on the color conversion parameter.

11. An image forming apparatus which performs image-forming processing for forming an image on an image forming medium, the image forming apparatus comprising:

a first storage unit which stores a default set value regarding settings of the image-forming processing according to identification information for specifying a group;

an identification information input unit for inputting the identification information;

a setting unit which configures the settings of the image-forming processing based on the default set value stored in the first storage unit corresponding to the identification information input by the identification information input unit;

an operation unit for instructing changes in the settings based on the default set value which was set by the setting unit;

a setting change unit which changes the settings of the image-forming processing based on the changes instructed by the operation unit;

a second storage unit which stores information representing the settings changed by the setting change unit, and the number of times the image-forming processing has been performed for each group specified by the identification information;

an updating unit which updates the default set value of the group in which the number of executions of the image-forming processing stored in the second storage unit reached a predetermined number, based on the settings stored in the second storage unit; and a communication unit for performing data communication with an external device, wherein the updating unit determines, when the communication unit receives the identification information and a reference value for changing the default set value from the external device, the change in the default set value corresponding to the group specified by the received identification information based on the reference value.

12. A method for forming an image on an image forming medium, comprising:

storing a default set value regarding settings of the image-forming processing according to identification information for specifying a group in a first storage unit;

inputting the identification information with an identification information input unit;

configuring the settings of the image-forming processing based on the default set value stored in the first storage unit corresponding to the identification information input by the identification information input unit with a setting unit;

instructing changes in the settings based on the default set value which was set by the setting unit with an operation unit;

changing the settings of the image-forming processing based on the changes instructed by the operation unit with a setting change unit;

storing information representing the settings changed by the setting change unit, and the number of times the image-forming processing has been performed for each group specified by the identification information in a second storage unit; and updating the default set value of the group based on the settings stored in the second storage unit, in the case where the number of executions of the image-forming processing for the group stored in the second storage unit reached a predetermined number.

13. The image forming method according to claim 12, wherein the operation unit has a button for instructing a change in one of a source document mode, hue, color saturation, sharpness, color balance and adjustment value for each color.

14. The image forming method according to claim 12, further comprising converting a color signal of a color image to a different color signal based on a color conversion parameter with a color conversion unit, wherein the operation unit has a button for instructing a change in the color conversion parameter performed by the color conversion unit.

15. The image forming method according to claim 12 further comprising performing gradation correction of an image based on various parameters with a gradation process unit, wherein the operation unit has a button for changing a parameter for the gradation correction by the gradation process unit.

16. The image forming method according to claim 12, further comprising informing that the default set value has been changed when the identification information of a group whose default set value has been changed by the updating unit is input to the identification information input unit with a notification unit.

17. A method for forming an image on an image forming medium, comprising:

storing a default set value regarding settings of the image-forming processing according to identification information for specifying a group in a first storage unit;

inputting the identification information with an identification information input unit;

configuring the settings of the image-forming processing based on the default set value stored in the first storage unit corresponding to the identification information input by the identification information input unit with a setting unit;

instructing changes in the settings based on the default set value which was set by the setting unit with an operation unit;

changing the settings of the image-forming processing based on the changes instructed by the operation unit with a setting change unit;

storing information representing the settings changed by the setting change unit, and the number of times the image-forming processing has been performed for each group specified by the identification information in a second storage unit;

updating the default set value of the group in which the number of executions of the image-forming processing stored in the second storage unit reached a predetermined number, based on the settings stored in the second storage unit with an updating unit;

wherein the operation unit instructs a change in one of a source document mode, hue, color saturation, sharpness, color balance and adjustment value for each color; and reading an image on a source document as image data consisting of each of the color signals R, G, and B with a reading unit, wherein the color conversion unit converts the image data consisting of each of the color signals R, G, and B read by the reading unit into image data consisting of each of color signals C, M, and Y, based on the color conversion parameter.

18. The image forming method according to claim 17, further comprising filter processing based on frequency characteristics which sets image data with a filter unit, wherein the operation unit has a button for instructing a change in the frequency characteristics set in the filter section.

* * * * *